(12) United States Patent
Flanigan et al.

(10) Patent No.: US 12,041,355 B2
(45) Date of Patent: Jul. 16, 2024

(54) MODULAR IMAGE CAPTURE SYSTEMS

(71) Applicant: GoPro, Inc., San Mateo, CA (US)

(72) Inventors: Sean Flanigan, San Mateo, CA (US); Joseph A. Enke, Campbell, CA (US); Pablo Lema, Burlingame, CA (US); Nicholas D. Woodman, Big Sky, MT (US); Michael Paterson, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/196,116

(22) Filed: May 11, 2023

(65) Prior Publication Data

US 2023/0283902 A1 Sep. 7, 2023

Related U.S. Application Data

(63) Continuation of application No. 17/062,126, filed on Oct. 2, 2020, now Pat. No. 11,653,095, which is a
(Continued)

(51) Int. Cl.
*H04N 23/68* (2023.01)
*B64C 39/02* (2023.01)
(Continued)

(52) U.S. Cl.
CPC ......... *H04N 23/687* (2023.01); *B64C 39/024* (2013.01); *B64D 47/08* (2013.01);
(Continued)

(58) Field of Classification Search
CPC .. H04N 5/2328; H04N 5/2253; H04N 5/2257; B64C 39/024; B64C 47/08; B64C 2201/127; B64C 2201/146; G05D 1/0038
See application file for complete search history.

(56) References Cited

U.S. PATENT DOCUMENTS 2,362,773 A 11/1944 Robinson
4,752,791 A 6/1988 Allred
(Continued)

FOREIGN PATENT DOCUMENTS

CN 101370128 A 2/2009
CN 201477355 5/2010
(Continued)

OTHER PUBLICATIONS

3D Robotics, Inc., 'IRIS Operational Manual,' Oct. 16, 2013, 35 Pages, [online] [Retrieved on Apr. 29, 2016] Retrieved from the Internet <URL:https://3dr.com/wp-content/uploads/2013/10/operation-manual-compressed.pdf>.
(Continued)

*Primary Examiner* — Thomas Ingram
(74) *Attorney, Agent, or Firm* — Young Basile Hanlon & MacFarlane, P.C.

(57) ABSTRACT

A system including an image capture module and a handheld module. The image capture module includes a body; an image sensor; and a mechanical stabilization system comprising a first gimbal, a second gimbal, and a third gimbal connected to the body and configured to control an orientation of the image sensor of the image capture module relative to the body. The handheld module defines a slot that is keyed to the body of the image capture module. The image capture module, when located within the handheld module, has a low profile so that the third gimbal is protected from damage by the handheld module.

20 Claims, 14 Drawing Sheets

Related U.S. Application Data continuation of application No. 15/892,077, filed on Feb. 8, 2018, now Pat. No. 10,827,123.

(60) Provisional application No. 62/614,140, filed on Jan. 5, 2018.

(51) Int. Cl.

| | | |
|---|---|---|
| *B64D 47/08* | (2006.01) | |
| *B64U 101/30* | (2023.01) | |
| *G03B 15/00* | (2021.01) | |
| *G05D 1/00* | (2024.01) | |
| *G06F 3/04883* | (2022.01) | |
| *G08G 5/00* | (2006.01) | |
| *H04N 7/18* | (2006.01) | |
| *H04N 23/51* | (2023.01) | |
| *H04N 23/54* | (2023.01) | |
| *H04N 23/57* | (2023.01) | |
| *H04N 23/62* | (2023.01) | |
| *H04N 23/66* | (2023.01) | |

(52) U.S. Cl.
CPC ......... *G03B 15/006* (2013.01); *G05D 1/0016* (2013.01); *G05D 1/0038* (2013.01); *G05D 1/0094* (2013.01); *G05D 1/12* (2013.01); *G08G 5/0069* (2013.01); *H04N 7/18* (2013.01); *H04N 23/51* (2023.01); *H04N 23/54* (2023.01); *H04N 23/57* (2023.01); *H04N 23/62* (2023.01); *H04N 23/66* (2023.01); *H04N 23/685* (2023.01); *B64U 2101/30* (2023.01); *B64U 2201/10* (2023.01); *B64U 2201/20* (2023.01); *G06F 3/04883* (2013.01); *H04N 7/183* (2013.01); *H04N 7/185* (2013.01)

(56) References Cited

U.S. PATENT DOCUMENTS

| | | |
|---|---|---|
| 5,311,859 A | 5/1994 | Monroe |
| 5,469,209 A | 11/1995 | Gunday |
| 5,548,327 A | 8/1996 | Gunday |
| 6,384,976 B1 | 5/2002 | Ishijima |
| 7,643,063 B2 | 1/2010 | Trescott |
| 7,876,359 B2 | 1/2011 | Von |
| 7,932,925 B2 | 4/2011 | Inbar |
| 8,265,808 B2 | 9/2012 | Garrec |
| 8,292,215 B2 | 10/2012 | Olm |
| 8,434,950 B1 | 5/2013 | Wawro |
| D694,802 S | 12/2013 | Coyle |
| 8,654,427 B1 | 2/2014 | Deangelo |
| 8,861,947 B2 | 10/2014 | Webb |
| 8,908,090 B2 | 12/2014 | Webb |
| 8,989,922 B2 | 3/2015 | Jones |
| 9,030,149 B1 | 5/2015 | Chen |
| D732,601 S | 6/2015 | Coyle |
| 9,143,686 B2 | 9/2015 | Lee |
| 9,144,714 B2 | 9/2015 | Hollinger |
| 9,164,506 B1 | 10/2015 | Zang |
| 9,239,468 B2 | 1/2016 | Webb |
| 9,264,599 B2 | 2/2016 | Reid |
| 9,277,130 B2 | 3/2016 | Wang |
| 9,280,038 B1 | 3/2016 | Pan |
| 9,360,740 B2 | 6/2016 | Wagner |
| 9,436,181 B2 | 9/2016 | Peeters |
| 9,574,703 B2 | 2/2017 | Firchau |
| D785,073 S | 4/2017 | Wang |
| D790,000 S | 6/2017 | Wang |
| 9,678,411 B1 | 6/2017 | Harden |
| 9,692,972 B2 | 6/2017 | Karpenko |
| D794,606 S | 8/2017 | Zheng |
| 9,749,544 B2 | 8/2017 | Wang |
| D799,448 S | 10/2017 | Zheng |
| 9,777,887 B2 | 10/2017 | Pan |
| 9,859,938 B2 | 1/2018 | Piccioni |
| 9,863,171 B1 | 1/2018 | Salter |
| 9,874,308 B2 | 1/2018 | Saika |
| D815,180 S | 4/2018 | Kim |
| 10,008,028 B2 | 6/2018 | Zuccarino |
| D824,882 S | 8/2018 | Zheng |
| D826,310 S | 8/2018 | Wang |
| 10,054,258 B2 | 8/2018 | Wang |
| 10,129,478 B2 * | 11/2018 | Zhao .................... G05D 1/0011 |
| D836,699 S | 12/2018 | Kim |
| 10,150,576 B2 | 12/2018 | Saika |
| 10,227,898 B2 | 3/2019 | Kawashima |
| 10,274,127 B2 | 4/2019 | Wei |
| 10,274,129 B2 | 4/2019 | Saika |
| D849,107 S | 5/2019 | Huang |
| D863,411 S | 10/2019 | Liao |
| 10,436,069 B2 | 10/2019 | Azuma |
| D874,539 S | 2/2020 | Wang |
| D879,175 S | 3/2020 | Matsumoto |
| 10,735,653 B1 | 8/2020 | Huang |
| D897,399 S | 9/2020 | Wang |
| 10,827,123 B1 | 11/2020 | Flanigan |
| D909,447 S | 2/2021 | Shaomin |
| D911,415 S | 2/2021 | Fang |
| 10,914,419 B2 | 2/2021 | Saika |
| D943,016 S | 2/2022 | Li |
| 11,375,117 B2 | 6/2022 | Enke |
| D960,221 S | 8/2022 | Wang |
| D961,652 S | 8/2022 | Chen |
| 11,480,291 B2 | 10/2022 | Saika |
| D971,304 S | 11/2022 | Deng |
| 11,523,057 B2 | 12/2022 | Flanigan |
| 2001/0013890 A1 * | 8/2001 | Narayanaswami .......................... H04N 1/00907 348/E5.025 |
| 2003/0076421 A1 | 4/2003 | Dutta |
| 2004/0173726 A1 | 9/2004 | Mercadal |
| 2005/0029398 A1 | 2/2005 | Lowe |
| 2005/0185089 A1 | 8/2005 | Chapman |
| 2005/0243173 A1 | 11/2005 | Levine |
| 2006/0239678 A1 | 10/2006 | Itzkowitz |
| 2007/0152116 A1 | 7/2007 | Madsen |
| 2009/0003822 A1 | 1/2009 | Tyner |
| 2009/0008499 A1 | 1/2009 | Shaw |
| 2009/0190916 A1 | 7/2009 | Sharp |
| 2009/0219402 A1 | 9/2009 | Schneider |
| 2009/0257741 A1 | 10/2009 | Greb |
| 2010/0079101 A1 | 4/2010 | Sidman |
| 2011/0188847 A1 | 8/2011 | McKay |
| 2011/0221900 A1 | 9/2011 | Reich |
| 2012/0062691 A1 | 3/2012 | Fowler |
| 2012/0180789 A1 | 7/2012 | Tobia |
| 2012/0233000 A1 | 9/2012 | Fisher |
| 2012/0268614 A1 | 10/2012 | Webb |
| 2013/0088610 A1 | 4/2013 | Lee |
| 2013/0210563 A1 | 8/2013 | Hollinger |
| 2013/0250126 A1 | 9/2013 | Nakamura |
| 2014/0024999 A1 | 1/2014 | Levien |
| 2014/0263823 A1 * | 9/2014 | Wang ................... B64D 47/08 244/17.23 |
| 2014/0368911 A1 | 12/2014 | Becker |
| 2015/0085149 A1 | 3/2015 | Tsubaki |
| 2015/0094883 A1 * | 4/2015 | Peeters .................. B64C 19/00 701/3 |
| 2015/0097950 A1 | 4/2015 | Wang |
| 2015/0149000 A1 | 5/2015 | Rischmuller |
| 2015/0207964 A1 | 7/2015 | Bye |
| 2015/0219981 A1 | 8/2015 | Roberts |
| 2015/0304652 A1 | 10/2015 | Spas |
| 2015/0313445 A1 | 11/2015 | Davidson |
| 2015/0350543 A1 | 12/2015 | Hollinger |
| 2015/0381891 A1 | 12/2015 | Karpenko |
| 2016/0029105 A1 | 1/2016 | Newman |
| 2016/0033077 A1 | 2/2016 | Chen |
| 2016/0083110 A1 | 3/2016 | Pan |
| 2016/0171330 A1 | 6/2016 | Mentese |
| 2016/0201847 A1 | 7/2016 | Firchau |
| 2016/0352992 A1 | 12/2016 | Saika |

(56) References Cited

U.S. PATENT DOCUMENTS

| | | | |
|---|---|---|---|
| 2016/0360111 A1 | 12/2016 | Thivent | |
| 2016/0381271 A1 | 12/2016 | Cheng | |
| 2017/0002975 A1 | 1/2017 | Yang | |
| 2017/0002976 A1 | 1/2017 | Wang | |
| 2017/0006340 A1 | 1/2017 | Enke | |
| 2017/0036771 A1 | 2/2017 | Woodman | |
| 2017/0041652 A1 | 2/2017 | Ko | |
| 2017/0064176 A1 | 3/2017 | Kim | |
| 2017/0108168 A1 | 4/2017 | Pan | |
| 2017/0108861 A1 | 4/2017 | Enke | |
| 2017/0134631 A1* | 5/2017 | Zhao | H04N 23/695 |
| 2017/0138534 A1 | 5/2017 | Chen | |
| 2017/0143442 A1 | 5/2017 | Tesar | |
| 2017/0159875 A1 | 6/2017 | Wagner | |
| 2017/0178392 A1 | 6/2017 | Zuccarino | |
| 2017/0185954 A1 | 6/2017 | McAllister | |
| 2017/0192342 A1 | 7/2017 | Liu | |
| 2017/0222676 A1 | 8/2017 | Piccioni | |
| 2017/0227162 A1 | 8/2017 | Saika | |
| 2017/0262009 A1 | 9/2017 | Peng | |
| 2017/0358141 A1 | 12/2017 | Stafford | |
| 2017/0363391 A1 | 12/2017 | Conklin | |
| 2018/0025498 A1 | 1/2018 | Omari | |
| 2018/0035020 A1 | 2/2018 | Pan | |
| 2018/0079529 A1 | 3/2018 | Saika | |
| 2018/0093638 A1* | 4/2018 | Piccioni | H04B 1/3883 |
| 2018/0106422 A1 | 4/2018 | Saika | |
| 2018/0112980 A1 | 4/2018 | Diem | |
| 2018/0151036 A1 | 5/2018 | Cha | |
| 2018/0194488 A1 | 7/2018 | Zhao | |
| 2018/0205932 A1 | 7/2018 | Yu | |
| 2018/0255247 A1 | 9/2018 | Ristroph | |
| 2018/0321328 A1 | 11/2018 | Kushleyev | |
| 2018/0352144 A1* | 12/2018 | Miao | H04N 23/67 |
| 2019/0003639 A1 | 1/2019 | Wang | |
| 2019/0008256 A1 | 1/2019 | Basham | |
| 2019/0215457 A1 | 7/2019 | Enke | |
| 2019/0226636 A1 | 7/2019 | Saika | |
| 2019/0230289 A1 | 7/2019 | Flanigan | |
| 2021/0127064 A1 | 4/2021 | Flanigan | |
| 2021/0148508 A1 | 5/2021 | Saika | |
| 2022/0163874 A1 | 5/2022 | Chang | |
| 2023/0041357 A1 | 2/2023 | Noriaki | |
| 2023/0097566 A1 | 3/2023 | Flanigan | |

FOREIGN PATENT DOCUMENTS

| | | |
|---|---|---|
| CN | 201535852 U | 7/2010 |
| CN | 101872196 A | 10/2010 |
| CN | 102278989 A | 12/2011 |
| CN | 102355574 A | 2/2012 |
| CN | 103064430 A | 4/2013 |
| CN | 103926940 A | 7/2014 |
| CN | 203757300 U | 8/2014 |
| CN | 104360690 A | 2/2015 |
| CN | 104871082 A | 8/2015 |
| CN | 303348632 S | 8/2015 |
| EP | 0588684 A1 | 3/1994 |
| EP | 0771729 A1 | 5/1997 |
| EP | 1912015 A2 | 4/2008 |
| EP | 2908203 A1 | 8/2015 |
| EP | 3139239 A1 | 3/2017 |
| JP | 2002051118 A | 2/2002 |
| WO | 0235824 A1 | 5/2002 |
| WO | 2017035840 A1 | 3/2017 |
| WO | 2018027340 | 2/2018 |

OTHER PUBLICATIONS

DJI Innovations, 'Phantom FC40 User Manual,' Mar. 21, 2014, 31 Pages, [online] [Retrieved on Apr. 29, 2016] Retrieved from the Internet <URL:http://dl.djicdn.com/downloads/phantom_fc40/en/Phantom_FC40_User_Manual_v1.06_en.pdf>.

DJI Innovations, 'Phantom Quick Start Manual V1.2,' 2012, pp. 1-16, [online] [Retrieved on Apr. 29, 2016] Retrieved from the Internet <URL:http://www.rapidonline.com/pdf/595538_an_en_01.pdf>.

DJI Inspire 1 User Manual, V2.2, 2017 (Year: 2017) (64 pages).

Extended European Search Report for App. No. EP19212177.0, mailing date Jun. 24, 2020, 17 pages.

Fantomas, 'Guide to the Phantom 2 Vision & Vision+,' Dec. 4, 2014, 49 Pages, [online] [Retrieved on Apr. 29, 2016] Retrieved from the Internet <URL:http://www.droneflyersxom/wp-content/uploads/2014/12/DJI-Phantom-Vision-Summary-Guide.pdf>.

Film Like a Pro: DJI Drone "ActiveTrack"—With Video Tutorials, DJI, Dec. 18, 2017, https://store.dji.com/guides/ film-like-a-pro-with-activetrack/ (Year: 2017) (12 pages).

hobbyking.com, 'Nova Manual,' 1 page, [online] [Retrieved on Apr. 29, 2016] Retrieved from the Internet <URL: http://www.hobbyking.com/hobbyking/store/uploads/65525800X365809X9.pdf>. (1 page).

Horizon Hobby, Inc., 'Blade 350 QX Instruction Manual,' 2013, 20 Pages, [online] [Retrieved on Apr. 29, 2016] Retrieved from the Internet <URL:http://www.bladehelis.com/ProdInfo/Files/BLH7800-Manual_EN.pdf>.

International Preliminary Report on Patentability and Written Opinion for App. No. PCT/US2019/012253, dated Jul. 7, 2020, 10 pages.

International Search Report and Written Opinion for Application No. PCT/US 2019/012253, date of mailing Mar. 25, 2019, 14 pages.

Johnson, M., 'Heli Pilot Review,' DJI—Innovations, Apr. 2013, pp. 22-26, [online] [Retrieved on Apr. 29, 2016] Retrieved from the Internet <URL:http://www.visual-aerials.com/uploads/3/3/9/9/3399523/visual-aerials_rc_heli_phantom_april2013.pdf>.

Karma Grip Let's Get Started retrieved on Feb. 21, 2018 from URL https://gopro.com/content/dam/help/karma/karma-grip-quick-start-guides/Karma-Grip_QSG_HERO5_ENG_REVA.pdf (7 pages).

Osmo—Reimagine Movement—DJI retrieved on Feb. 21, 2018 from URL https://www.dji.com/osmo (11 pages).

Patent Cooperation Treaty, International Search Report and Written Opinion of the International Searching Authority, International Patent Application No. PCT/US2016/028518, Sep. 1, 2016, 10 Pages.

PCT International Search Report and Written Opinion for PCT/US2016/028518, Sep. 1, 2016, 14 Pages.

PCT Invitation to Pay Additional Fees and, Where Applicable, Protest Fee, PCT/US2016/028518, Jun. 13, 2016, 2 Pages.

Rick Miller et al.: "Gimbal system configurations and line-of-sight control techniques for small UAV applications", Proceedings of SPIE, vol. 8713, May 31, 2013 (May 31, 2013), p. 871308, XP044347865, US DOI: 10.1117/12.2015777, ISBN: 978-1-5106-1533-5.

TBS Discovery, 'TBS Discovery Quadrotor,' ivc.no, Sep. 21, 2014, 33 Pages, [online] [Retrieved on Apr. 29, 2016] Retrieved from the Internet <URL:http://www.team-blacksheep.com/tbs-disco very-manual.pdf>.

U.S. Appl. No. 15/892,077, filed Feb. 8, 2018, Flanigan et al., 57 pages.

U.S. Appl. No. 15/934,204, filed Mar. 23, 2018, Enke et al., 81 pages.

YI Action Gimbal | YI Technology retrieved on Feb. 21, 2018 from URL https://www.yitechnology.com/yi-action-gimbal (18 pages).

Youtube, Video for 'Feiyu-Tech G3 Ultra—3 Axis Gimbal—Review & Testing,' Jun. 12, 2014, 1 Page, can be retrieved from the internet at <URL:https://www.youtube.com/watch?v=WDwRUkjSPZU>.

* cited by examiner

MODULAR IMAGE CAPTURE SYSTEMS

CROSS REFERENCE TO RELATED APPLICATIONS

This application is a continuation of U.S. application Ser. No. 17/062,126, filed Oct. 2, 2020, which is a continuation of U.S. application Ser. No. 15/892,077, filed Feb. 8, 2018, now U.S. Pat. No. 10,827,123, which claims the benefit of U.S. Provisional Application No. 62/614,140, filed Jan. 5, 2018, the contents of which are incorporated by reference herein in their entirety.

TECHNICAL FIELD

This disclosure relates to modular image capture systems.

BACKGROUND

Image capture devices, such as cameras, may capture content as images or video. Drones have been used to carry cameras and to enable capture of images from the air. Drones with attached cameras are typically controlled by controllers via a wireless communications link. Mechanical stabilization systems (e.g., gimbals and motors) have been used with drone based cameras to reduce distortion or shakiness of captured images that can be caused by vibrations and other motions of a drone during capture.

SUMMARY

Disclosed herein are implementations of modular image capture systems.

In a first aspect, the subject matter described in this specification can be embodied in systems that include an image capture module including an image sensor configured to capture images, a connector, and an integrated mechanical stabilization system configured to control an orientation of the image sensor relative to the connector; an aerial vehicle configured to be removably attached to the image capture module by the connector and to fly while carrying the image capture module; and a handheld module configured to be removably attached to the image capture module by the connector, wherein the handheld module includes a battery and an integrated display configured to display images received from the image sensor.

In a second aspect, the subject matter described in this specification can be embodied in methods that include connecting an image capture module, which includes an image sensor and an integrated mechanical stabilization system, to an aerial vehicle; flying the aerial vehicle with the image capture module attached to the aerial vehicle and capturing a first image with the image sensor while flying; disconnecting the image capture module from the aerial vehicle; connecting the image capture module to a handheld module, which includes a battery and an integrated display; and capturing a second image with the image sensor while the image capture module is attached to the handheld module and drawing power from the battery.

In a third aspect, the subject matter described in this specification can be embodied in image capture modules that include an image sensor configured to capture images; a mechanical stabilization system, including gimbals and motors, that is integrated with the image sensor in the image capture module and configured to control an orientation of the image sensor; and a connector configured to interchangeably connect the mechanical stabilization system to an aerial vehicle in a first usage scenario and a handheld module in a second usage scenario, wherein a gimbal of the mechanical stabilization system is substantially flush with a surface of the connector.

The present teachings provide a system including an image capture module and a handheld module. The image capture module includes a body; an image sensor; and a mechanical stabilization system comprising a first gimbal, a second gimbal, and a third gimbal connected to the body and configured to control an orientation of the image sensor of the image capture module relative to the body. The handheld module defines a slot that is keyed to the body of the image capture module. The image capture module, when located within the handheld module, has a low profile so that the third gimbal is protected from damage by the handheld module. The present teachings provide a system having an image capture module and a handheld module. The image capture module has a body; a connector located at a bottom of the body; an image sensor; and a mechanical stabilization system comprising a first gimbal, a second gimbal, and a third gimbal connected to the body and configured to control an orientation of the image sensor of the image capture module relative to the body. The handheld module has a slot that receives the connector of the image capture module; and a fastening mechanism that is configured to form a removable locked connection between the image capture module and the handheld module so that when the connector is inserted into the slot, a connection is formed between the image capture module and the handheld module.

The present teachings provide a system including an image capture module and a handheld module. The image capture module has a body; a mated electronic connector located at a base of the body; an image sensor; and a mechanical stabilization system comprising a first gimbal, a second gimbal, and a third gimbal connected to the body and configured to move of the image sensor. The handheld module defines a slot that is shaped to match a shape of the body of the image capture module. The image capture module, when located within the slot of the handheld module, has a profile so that the third gimbal is protected from damage by the handheld module.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings.

DETAILED DESCRIPTION

This document includes disclosure of modular image capture systems and techniques for image capture. An image capture module is described that includes an image sensor, a mechanical stabilization system (e.g., including gimbals and motors) that is integrated with the image sensor in the image capture module and configured to control an orientation of the image sensor, and a connector configured to interchangeably connect the mechanical stabilization system to an aerial vehicle and a handheld module. The image capture module can be easily connected to different movable platforms, including the aerial vehicle and the handheld module, to suit different circumstances and usage scenarios. By integrating the mechanical stabilization system in the image capture module, a more reliable and light weight attachment is provided between the mechanical stabilization system and the image sensor as compared to systems with a separable mechanical stabilization system.

The weight of the combination of the image capture module and the aerial vehicle is an important design consideration that effects performance in terms of maneuverability and power consumption, which directly effects usable battery time. The weight of the combination of the image capture module and the aerial vehicle can be further reduced by omitting a display and a battery from the image capture module (or including a considerably smaller battery) and instead incorporating a display and a battery in the handheld module, which can provide the power and control interface suited for handheld usage scenarios.

The proposed modular image capture systems and methods may offer advantages over conventional image capture systems. For example, the quality of captured images may be improved (e.g., by reducing blur and other motion artifacts and distortions) across a variety of usage scenarios by a mechanical stabilization system that is integrated into the image capture module that can be easily and interchangeably attached to a variety of movable platforms suited to those usage scenarios. For example, the weight of a movable imaging assembly including an aerial vehicle and the image capture module may be reduced, resulting in lower power consumption, longer battery usage times, greater maneuverability, and improved safety by reducing the risk of injuries or damage from collisions.

Implementations are described in detail with reference to the drawings, which are provided as examples to enable those skilled in the art to practice the technology. The figures and examples are not meant to limit the scope of the present disclosure to a single implementation or embodiment, and other implementations and embodiments are possible by way of interchange of, combination with, and/or removal of some or all of the described or illustrated elements. Wherever convenient, the same reference numbers will be used throughout the drawings to refer to same or like parts.

Figure 1A:
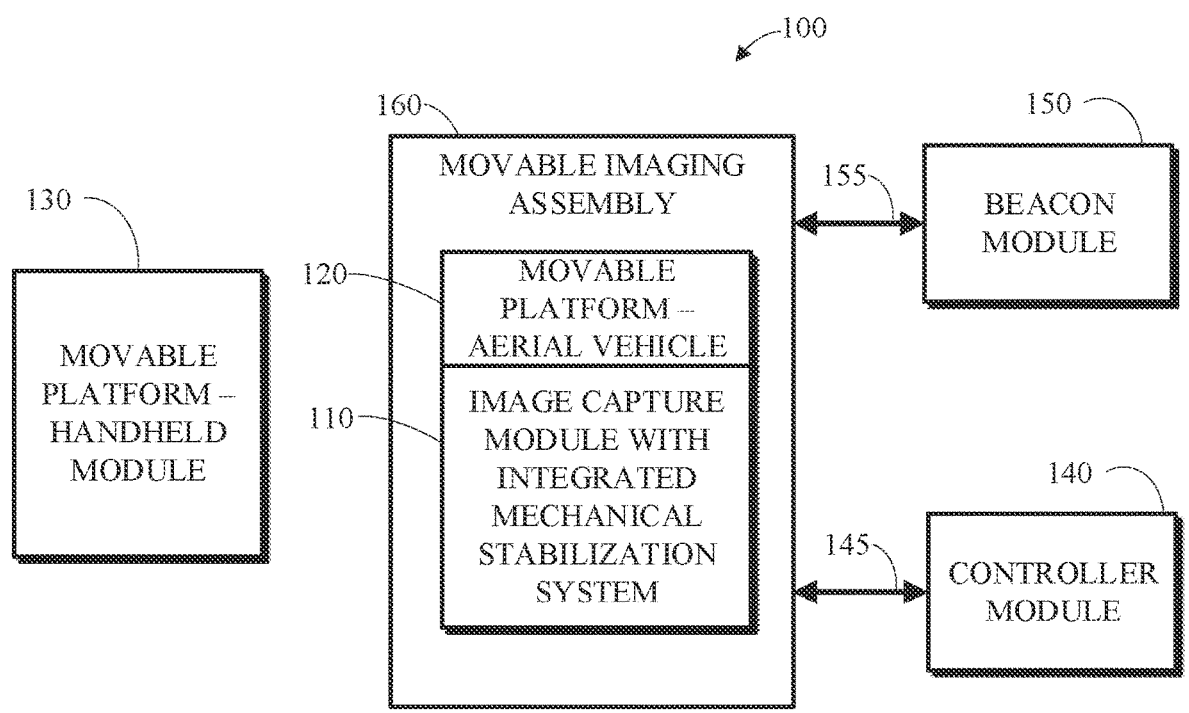
FIG. 1A is a block diagram of an example of a movable imaging system with modular components in a first usage scenario.

FIG. 1A is a block diagram of an example of a movable imaging system 100 with modular components in a first usage scenario. The movable imaging system 100 includes an image capture module 110 with an integrated mechanical stabilization system, an aerial vehicle 120, a handheld module 130, a controller module 140, and a beacon module 150. The image capture module 110 includes a connector that enables the aerial vehicle 120 and the handheld module 130 to be removably attached to the image capture module 110 as movable platforms for image capture in different usage scenarios. The connector may be mechanical and/or electrical. In this first usage scenario of FIG. 1A, the aerial vehicle 120 is attached to the image capture module 110 to form a movable imaging assembly 160 that may be used to capture images (e.g., still images or video) while the movable imaging assembly 160 moves in response to signals from the controller module 140 and/or the beacon module 150. In this first usage scenario of FIG. 1A, the handheld module 130 is disconnected from the image capture module 110.

The image capture module 110 includes an image sensor configured to capture images, a connector, and an integrated mechanical stabilization system configured to control an orientation of the image sensor relative to the connector. For example, the image capture module 110 may be the image capture module 200 of FIGS. 2A and 2B. The mechanical stabilization system is integrated in the sense that it is a part of the image capture module 110 that cannot be easily removed without the use of tools or damaging the image capture module 110. For example, the mechanical stabilization system may include gimbals (e.g., three gimbals) and motors that are configured to control an orientation of the image sensor relative to the connector. The mechanical stabilization system may enable capture of high quality images with low blur and/or reduced shaking or other motion between images in a sequence of images (e.g., frames of video). In some implementations, the mechanical stabilization system enables or improves subject tracking functions, in which a position and/or orientation of the image sensor is actively controlled to follow an object (e.g., a person) appearing a field of view of the image sensor. Having the mechanical stabilization system integrated avoids the use of a potentially unreliable connection between the mechanical stabilization system and the image sensor and can reduce the size and weight of the materials used to attached the mechanical stabilization system to the image sensor. Size and weight are generally important considerations in electronics, but they may be particularly significant in applications, like the first usage scenario of FIG. 1A, where the image capture module 110 including the image sensor and the mechanical stabilization system will be carried by the aerial vehicle 120. Reducing weight of the movable imaging assembly 160 may serve to decrease power consumption to increase battery time. Reducing weight of the movable imaging assembly 160 may also enable compliance with safety regulations applicable to the operation of the aerial vehicle 120 that limit weight of aerial vehicles.

The connector may be male or female. For example, the connector of the image capture module 110 may be keyed to a slot of the aerial vehicle 120 and keyed to a slot of the handheld module 130. The connector may be keyed by virtue of the shape of an outer surface of the connector, which is fitted to the corresponding shape of the slot in the aerial vehicle 120 and the corresponding shape in the slot of the handheld module 130. The keyed shape of the connector may include some asymmetry, which may facilitate easy connection of the aerial vehicle 120 and the handheld module 130 to the image capture module 110 by preventing a user from accidentally inserting the connector in an improper orientation. In some implementations, the connector includes one or more fastening mechanisms (e.g., latches) for securing a connection. The connector may include an electrical connector (e.g., a universal serial bus (USB) type C connector) nested inside of the keyed outer portion of the connector. The electrical connector may include multiple conductors that can be used to provide power from the aerial vehicle 120 to the image capture module 110 and transfer communication signals (e.g., USB 2.0, USB 3.0, I2C, SPI, and/or MIPI (Mobile Industry Processor Interface) signals) between the aerial vehicle 120 and the image capture module 110 when they are connected. For example, conductors of the connection may be used to transfer power, high-speed bulk data transfers, real-time embedded control signaling, and/or raw video signals at a capture frame rate. For example, the connector may include pairs of conductors respectively used to transfer power to the image capture module 110, bulk transfer data from the image capture module 110, transfer control signals to the image capture module 110, and transfer real-time video data from the image capture module 110. In some implementations, the connector lacks conductors for the transfer of data and/or power between the image capture module 110 and an attached movable platform (e.g., the aerial vehicle 120 in this first usage scenario). Power and/or data may be transferred wirelessly at short-range between the image capture module 110 and an attached movable platform. For example, the connector may include an interface for establishing a short-range, high-speed wireless link (e.g., employing technology promoted by Keyssa, Inc., which may be referred to as "Kiss Connectivity") for transferring data at suitable video capture data rates between the image capture module 110 and an attached movable platform. For example, the connector may include an interface (e.g., wireless charging interface or a near field communications interface) for inductively coupling power between the image capture module 110 and an attached movable platform. In some implementations, having a connector with fewer or no conductors may result in a more durable or reliable connector.

The image sensor of the image capture module 110 is configured to capture images (e.g., still images or frames of video). The image sensor may be configured to detect light of a certain spectrum (e.g., the visible spectrum or the infrared spectrum) and convey information constituting an image as electrical signals (e.g., analog or digital signals). For example, the image sensor may include charge-coupled devices (CCD) or active pixel sensors in complementary metal-oxide-semiconductor (CMOS). The image sensor may include an analog-to-digital converter and output digital image data. The image sensor may detect light incident through a lens (e.g., a rectilinear lens or a fisheye lens). In some implementations, the image capture module 110 includes multiple image sensors that have respective fields of view that overlap and images captured by these image sensors may be stitched together to generate composite images (e.g., panoramic images).

The movable imaging system 100 includes an aerial vehicle 120 (e.g., a drone) configured to be removably attached to the image capture module 110 by the connector and to fly while carrying the image capture module 110. The aerial vehicle 120 may be removably attached in the sense that a user can quickly connect and disconnect the aerial vehicle 120 from the image capture module 110 without using a tool (e.g., by engaging or disengaging one or more latches, rotary-type mechanisms, or click-type mechanisms using fingers). The aerial vehicle 120 may include a slot that fitted to the connector of the image capture module 110, in which the connector may be inserted. For example, the aerial vehicle 120 may include an electrical connector (e.g., a USB type C connector) nested in the slot that includes multiple conductors configured to transfer images and other data and control signals between the aerial vehicle 120 and the image capture module 110 when they are connected to form the movable imaging assembly 160. The nested electrical connector may further secure or guide the image capture module 110 into within the slot of the aerial vehicle 120. For example, the aerial vehicle 120 may be a quadcopter. In the first usage scenario of FIG. 1A, the aerial vehicle 120 is connected to the image capture module 110. For example, the aerial vehicle 120 may be the aerial vehicle 500 of FIG. 5.

The movable imaging system 100 includes a beacon module 150 configured to wirelessly transmit position data to the aerial vehicle 120 to enable the aerial vehicle 120 to follow the beacon module 150. The position data may be transmitted via a wireless link 155. For example, the beacon module 150 may include a global positioning system (GPS) receiver and the position data may include GPS coordinates of the beacon module 150. In some implementations, the beacon module 150 includes an inertial measurement unit (e.g., including accelerometers, gyroscopes, and/or magnetometers) and the position data includes changes in the position and/or orientation of the beacon module 150 that are sensed by the inertial measurement unit. For example, the wireless link 155 may utilize a wireless interface standard, such as WiFi, Bluetooth (BT), cellular data link, ZigBee, ANT+ link, or other wireless protocols. In some implementations, the aerial vehicle 120 is configured to follow a user based on position data from the beacon module 150 and based on computer vision tracking of the user in images from the image capture module. For example, quadratic estimation techniques (e.g., a Kalman filter) may be used to fuse position data from the beacon module 150 with computer vision features to estimate the position of a user holding or wearing the beacon module 150, and the position and/or orientation of the aerial vehicle 120 and the image sensor of the attached image capture module 110 may be controlled based on the estimate of the position of the user. For example, this control of the image sensor field of view may be actuated using the control surfaces (e.g., propellers) of the aerial vehicle 120 and/or the mechanical stabilization system (e.g., gimbals) of the image capture module 110. In some implementations, the beacon module 150 includes a user interface (e.g., including buttons and a display) that allows a user holding the beacon module 150 to issue commands to the movable imaging assembly 160 via the wireless link 155. For example, a user may issue commands to cause the movable imaging assembly 160 to follow the user, to pause following the user and hover in place, or to take-off or land. For example, the beacon module 150 may be the beacon module 650 of FIG. 6B.

The movable imaging system 100 includes a controller module 140 configured to wirelessly communicate with the aerial vehicle 120 to control motion of the aerial vehicle 120 and capture of images using the image sensor while the image capture module 110 is attached to the aerial vehicle 120. The controller module 140 includes a user interface (e.g., joysticks, buttons, and/or a touch-screen display) that allows a user to enter commands to control motion of the movable imaging assembly 160 and the capture of images. Information (e.g., control signals and/or image data) may be transferred between the movable imaging assembly 160 and the controller module via the wireless link 145. For example, the wireless link 145 may utilize a wireless interface standard, such as WiFi, Bluetooth (BT), cellular data link, ZigBee, ANT+ link, or other wireless protocols. For example, images (e.g., still images or video at full resolution or at reduced resolution) captured by the movable imaging assembly 160 may be received by the controller module 140 and displayed on a touch-screen display to the user. In some implementations, the aerial vehicle 120 is configured to communicate wirelessly with both the beacon module 150 and the controller module 140. Communicating with both the beacon module 150 and the controller module 140 may allow a first user to actively monitor and/or control image capture of the images by the movable imaging assembly 160 from the controller module 140 while the movable imaging assembly 160 follows a second user or other object that is bearing the beacon module 150 passively while moving. This may enhance hands-free following of a subject and enable following objects (e.g., a dog or a car) that are unable to issue commands to the movable imaging assembly 160 or make the experience of being followed more natural and less mentally taxing for the second user, so the second user can focus their attention on other activities (e.g., running, celebrating, soccer, skateboarding, motocross, surfing, snowboarding). The first user can focus on optimizing other aspects of image capture (e.g., choosing perspective on the subject, zooming, or timing snaps of still images) while the autonomous functions of the aerial vehicle 120 handle the following and navigation tasks. For example, the controller module 140 may be the controller module 600 of FIG. 6A.

Figure 1B:
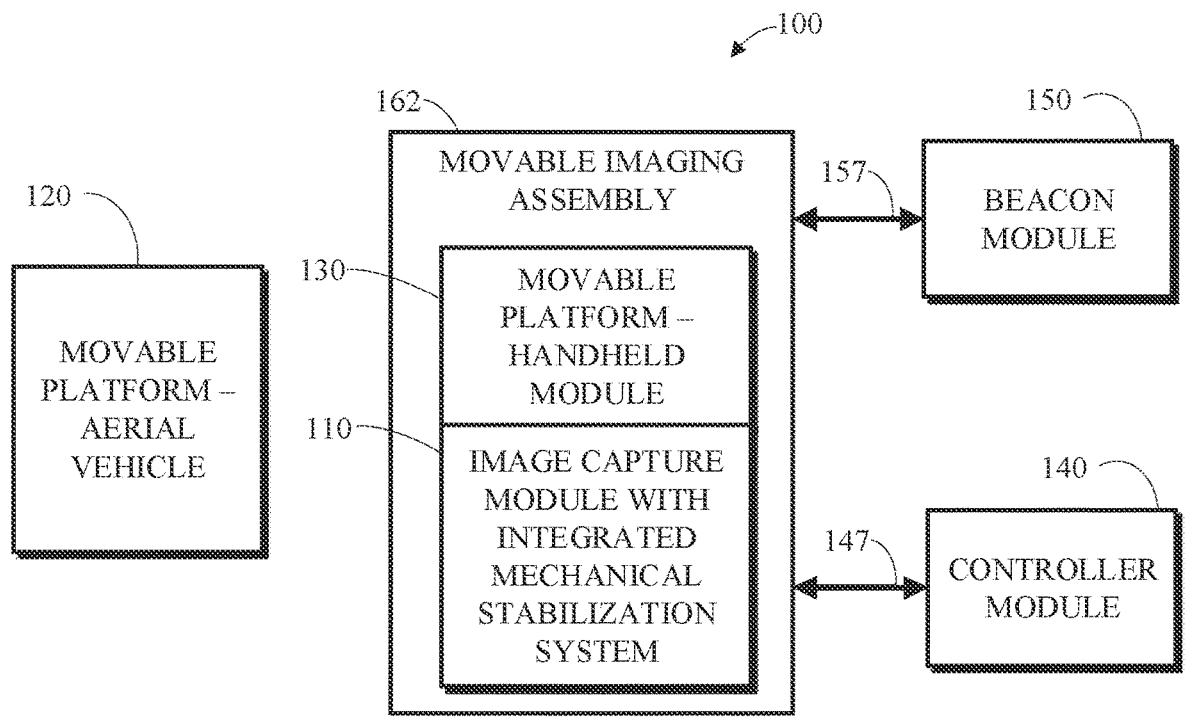
FIG. 1B is a block diagram of an example of a movable imaging system with modular components in a second usage scenario.

FIG. 1B is a block diagram of the movable imaging system 100 with modular components in a second usage scenario. In this second usage scenario of FIG. 1B, the handheld module 130 is attached to the image capture module 110 to form a movable imaging assembly 162 that may be used to capture images (e.g., still images or video) while the movable imaging assembly 162 moves in the hand of a user and/or in response to signals from the controller module 140 and/or the beacon module 150. In this second usage scenario of FIG. 1B, the aerial vehicle 120 is disconnected from the image capture module 110.

The movable imaging system 100 includes a handheld module 130 configured to be removably attached to the image capture module 110 by the connector. In some implementations, the handheld module 130 includes a battery and an integrated display configured to display images received from the image sensor (e.g., received via conductors of the connector or a short-range-high, high-speed wireless link). The handheld module 130 may be removably attached in the sense that a user can quickly connect and disconnect the handheld module 130 from the image capture module 110 without using a tool (e.g., by engaging or disengaging one or more latches, rotary-type mechanisms, or click-type mechanisms using fingers). In the second usage scenario of FIG. 1B, the handheld module 130 is connected to the image capture module 110. For example, the handheld module 130 may be the handheld module 300 of FIGS. 3A and 3B.

The handheld module 130 may include a slot that fitted to the connector of the image capture module 110, in which the connector may be inserted. For example, the handheld module 130 may include an electrical connector (e.g., a USB type C connector) nested in the slot that includes multiple conductors configured to transfer images and other data and control signals between the handheld module 130 and the image capture module 110 when they are connected to form the movable imaging assembly 162. The nested electrical connector may further secure or guide the image capture module 110 into within the slot of the handheld module 130. The slot of the handheld module 130 may include one or more fastening mechanisms configured to secure the attachment of the handheld module 130 to the connector during the second usage scenario of FIG. 1B. In some implementations, the handheld module 130 includes a first fastening mechanism and a second fastening mechanism (e.g., latches, clasps, or rotating mechanisms) configured to secure the connector when the image capture module is attached to the handheld module. The fastening mechanisms may be positioned such that either of the first fastening mechanism and second fastening mechanism is sufficient to secure the connector. In some implementations, a gimbal (e.g., a roll gimbal) of the mechanical stabilization system is substantially flush with a surface of the handheld module 130 when the image capture module is attached to the handheld module 130.

In the second usage scenario of FIG. 1B, for example, the movable imaging assembly 162 may be carried in a hand of a user who is able to point the image sensor at subjects for image capture and control image capture through a user interface (e.g., buttons and/or a touchscreen) of the handheld module 130. The user may view or preview captured images on a display of the handheld module 130. The battery of the handheld module 130 may provide power to the image capture module 110 during the second usage scenario.

In the second usage scenario of FIG. 1B, for example, the movable imaging assembly 162 may be mounted on a person or an object using a fastening article (e.g., a strap or helmet mount). For example, a skier may wear a strap or vest with a portion configured to hold the movable imaging assembly 162 in place on a portion of the skier's body (e.g., on the arm or chest) to capture images from their perspective as they move with their hands free down a slope. For example, the movable imaging assembly 162 may be positioned or mounted in a fixed location (e.g., on a tree branch or resting on the surface of a table). The movable imaging assembly 162 may be controlled by the controller module 140 and/or the beacon module 150 while mounted to adjust an orientation of the image sensor using the mechanical stabilization system (e.g., three gimbals and motors) and control other image capture features (e.g., snap a still image or adjust exposure time). Information (e.g., control signals and/or image data) may be transferred between the movable imaging assembly 162 and the controller module via the wireless link 147. For example, the wireless link 147 may utilize a wireless interface standard, such as WiFi, Bluetooth (BT), cellular data link, ZigBee, ANT+ link, or other wireless protocols. For example, images (e.g., still images or video at full resolution or at reduced resolution) captured by the movable imaging assembly 162 may be received by the controller module 140 and displayed on a touch-screen display to the user. The movable imaging assembly 162 may wirelessly receive position data from the beacon module 150 to enable the image sensor to follow the beacon module 150 by adjusting the orientation of the image sensor using the mechanical stabilization system. The position data may be received via a wireless link 157. For example, the wireless link 155 may utilize a wireless interface standard, such as WiFi, Bluetooth (BT), cellular data link, ZigBee, ANT+ link, or other wireless protocols. In some implementations, the movable imaging assembly 162 is configured to communicate wirelessly with both the beacon module 150 and the controller module 140 to enable following of a subject with the beacon module 150 with some supervision from a user of the controller module 140.

Although not explicitly shown in FIGS. 1A and 1B, the movable imaging system 100 may include additional components to facilitate image capture under diverse and potentially motion intensive circumstances. For example, the movable imaging system 100 may include a detachable flight battery for powering the aerial vehicle 120 and an AC charger for quickly charging the flight battery between flights in the first usage scenario. In some implementations, multiple detachable flight batteries are included in the movable imaging system 100 to continue use while a detachable flight battery is charging. For example, the movable imaging system 100 may include an AC charger for quickly charging the handheld module 130. For example, the movable imaging system 100 may include a mounting device (e.g., a strap, helmet mount, or mini tripod or wide base) for the handheld module 130. For example, the movable imaging system 100 may include one or more carrying cases for components of the movable imaging system 100. For example, the movable imaging system 100 may include cables (e.g., USB type C cable and HDMI cable) that can be used to connect a personal computing device (e.g., a smartphone, a tablet, or a laptop) to the image capture module 110, the aerial vehicle 120, and/or the handheld module 130 to perform bulk transfers of data (e.g., image data) and/or update software running on a processing apparatus of these components of the movable imaging system 100. An application may be installed on one or more external computing devices (e.g., a smartphone, a tablet, or a laptop) to facilitate pulling and sharing captured video content from the image capture module 110 and facilitating software upgrades to the image capture module 110, the aerial vehicle 120, the handheld module 130, and/or the controller module 140. The one or more external computing devices may communicate with the image capture module 110 via a wireless communications link or a wired communications link (e.g., a HDMI link). The application running on the external computing device may be configured to perform a variety of operations related to camera configuration, control of video acquisition, and/or display of video captured by the image capture module 110. An application (e.g., GoPro App) may enable a user to create short video clips and share video clips to a cloud service (e.g., cloud services commercially available from Instagram, Facebook, YouTube, or Dropbox); perform remote control of functions of the image capture module 110; live preview video being captured for shot framing; mark key moments while recording (e.g., HiLight Tag, View HiLight Tags in GoPro Camera Roll) for location and/or playback of video highlights; wirelessly control camera software; and/or perform other functions.

There may be multiple microphones positioned on the modular components of the movable imaging system 100. For example, an image capture module 110 may include two microphones positioned to facilitate the capture of stereo sound. For example, a single microphone may be included in the handheld module 130 (e.g., positioned on or near a side of the handheld module 130 that includes a display (e.g., the display 310). The microphone of the handheld module 130 may be used enable the suppression of wind noise. Having microphones on the image capture module 110 and the handheld module 130 may provide for diverse, well-spaced microphone locations on the movable imaging assembly 162, which may enable or improve noise suppression functions. A microphone located on the side of the handheld module 130 with the display may facilitate recording video with sound in a selfie use case for the movable imaging assembly 162. Having a single microphone in the handheld module may also reduce battery draining. In some implementations, multiple microphones are included on the handheld module 130 (e.g., to support the capture of stereo sound).

In some implementations, the movable imaging system 100 includes additional movable platforms that are configured to be removably attached to the image capture module 110 by the connector. For example, additional aerial vehicles with different size and range may be included. For example, an automated or autonomous land-based movable vehicle (e.g., a remote control car) may be included the movable imaging system 100 to support image capture in different circumstances, such as during a road race.

In some implementations, the movable imaging system 100 includes additional image capture modules with a connector like the connector of the image capture module 110 that is compatible to be removably attached to the aerial vehicle 120 and the handheld module 130. This may enable swapping out different versions of the image capture module 110 to tailor image capture capabilities to different usage scenarios. For example, some image capture modules may have only a single image sensor, while some image capture modules may have multiple image sensors and support panoramic image capture with stitching.

In some implementations, the handheld module 130 may be configured to control the movable imaging assembly 160 during the first usage scenario of FIG. 1A via wireless link. For example, the handheld module 130 may include hardware (e.g., a GPS receiver) and/or software to enable some or all of the functionality of the controller module 140 and/or the beacon module 150. For example, the handheld module 130 enable a user to issue a "follow-me" command to the movable imaging assembly 160 and transmit position data for the handheld module 130 to the movable imaging assembly 160 to cause the movable imaging assembly 160 to follow and capture images of a bearer of the handheld module. In some implementations (not shown), the controller module 140 and/or the beacon module 150 may be omitted from the movable imaging system 100.

In some implementations (not shown), a handheld module, with features similar to the handheld module 130, is integrated with an image capture module, with features similar to the image capture module 110, as a combined handheld image capture module. The combined handheld image capture module includes an image sensor, an integrated mechanical stabilization system configure to control an orientation of the image sensor, a display, a battery large enough to support operation similar to that described in the second usage scenario of FIG. 1B, and a connector configured to be removably attached to an aerial vehicle, which may be similar to the aerial vehicle 120, or another movable platform. For example, this aerial vehicle may include a hole or transparent panel in the bottom of the aerial vehicle through which the display and/or control interface of the combined handheld image capture module is visible and/or accessible while the combined handheld image capture module is attached to the aerial vehicle. For example, this accessible control interface may be used to control functions of the combined handheld image capture module and/or the aerial vehicle while they are attached. In some implementations, the display to the combined handheld image capture module may be powered down by default when the combined handheld image capture module is attached to the aerial vehicle or when in the air flying.

In some implementations (not shown), components and/or functionality of the controller module 140 and/or the beacon module 150 may be combined in a single device. The consolidation of these two devices may lessen the complexity, cost, and/or weight of the resulting movable imaging system with modular components.

In some implementations (not shown), a movable imaging system with modular components includes an image capture module without an integrated mechanical stabilization system that instead includes one or more modular mechanical stabilization systems (e.g., gimbals and motors) that are configured to be removably attached to the image capture module and multiple movable platforms. The one or more modular mechanical stabilization systems may be configured to control a relative orientation of an image sensor of the image capture module and a movable platform (e.g., an aerial vehicle or a handheld module) that is currently attached. For example, multiple modular mechanical stabilization systems may be included in this movable imaging system with different size, weight, and performance characteristics that are suited to different circumstances.

In some circumstances, it is desirable to track a target, which may include one or more subjects, with a movable imaging assembly (e.g., the movable imaging assembly 160 or the movable imaging assembly 162). Various forms of tracking may be utilized, including those discussed below and in U.S. Provisional Patent Application Ser. No. 62/364,960, filed Jul. 21, 2016, and herein incorporated by reference in its entirety. A tracking system may be utilized to implement the described forms of tracking. The tracking system may comprise a processor and algorithms that are used for tracking the target. A tracking system may be included entirely within the movable imaging assembly (e.g., the movable imaging assembly 160 or the movable imaging assembly 162) or entirely within the controller module 140 or an external computing device (e.g., a smartphone, a tablet, or a laptop) in communication with the movable imaging assembly, or portions of a tracking system may be located or duplicated within a movable imaging assembly and the controller module 140 or an external computing device. A voice recognition system may also be utilized to interact with the tracking system and issue commands (e.g., commands identifying or adjusting a target).

Figure 2A:
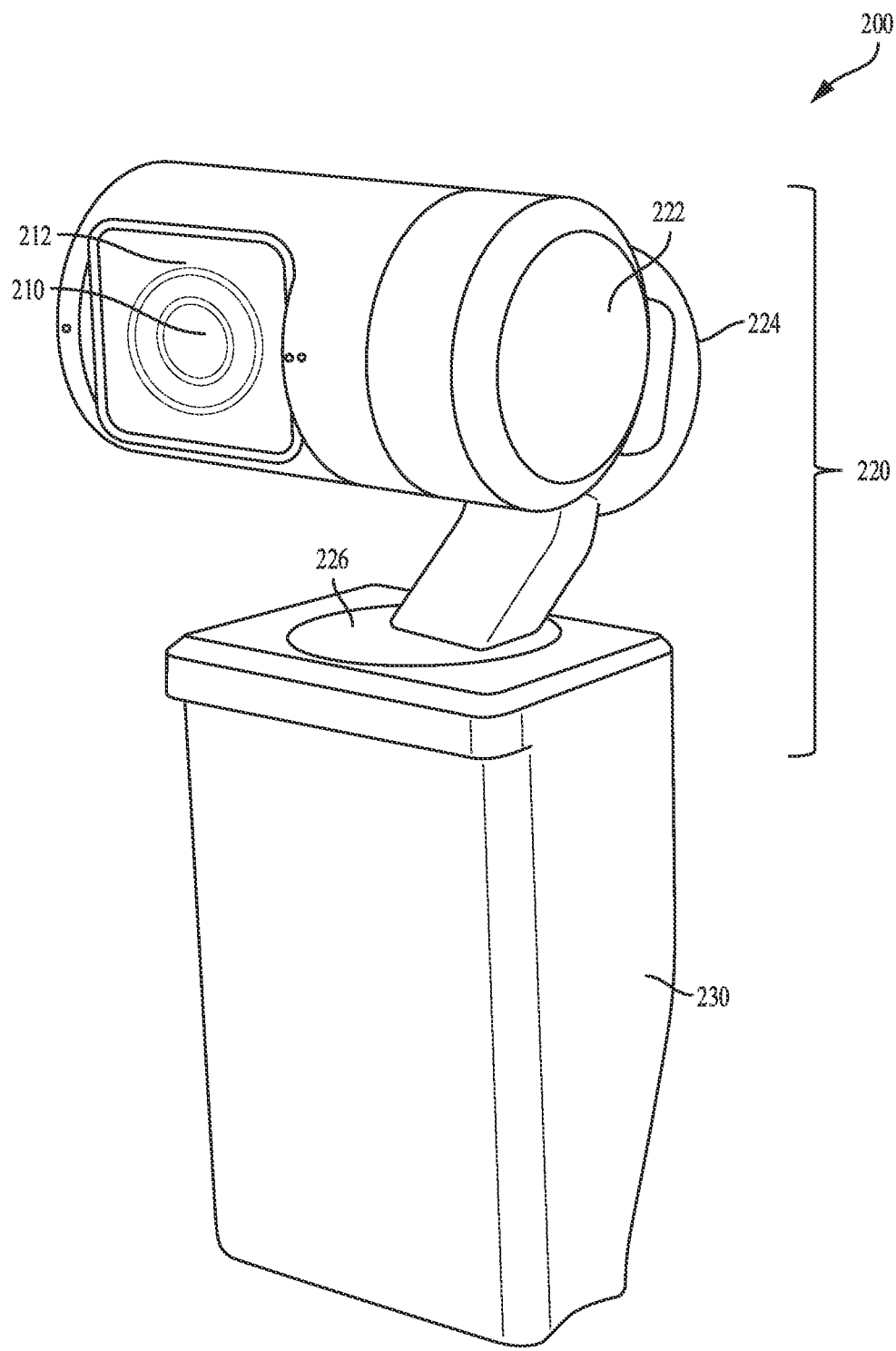
FIG. 2A is a pictorial illustration of an example of an image capture module from a first perspective.
Figure 2B:
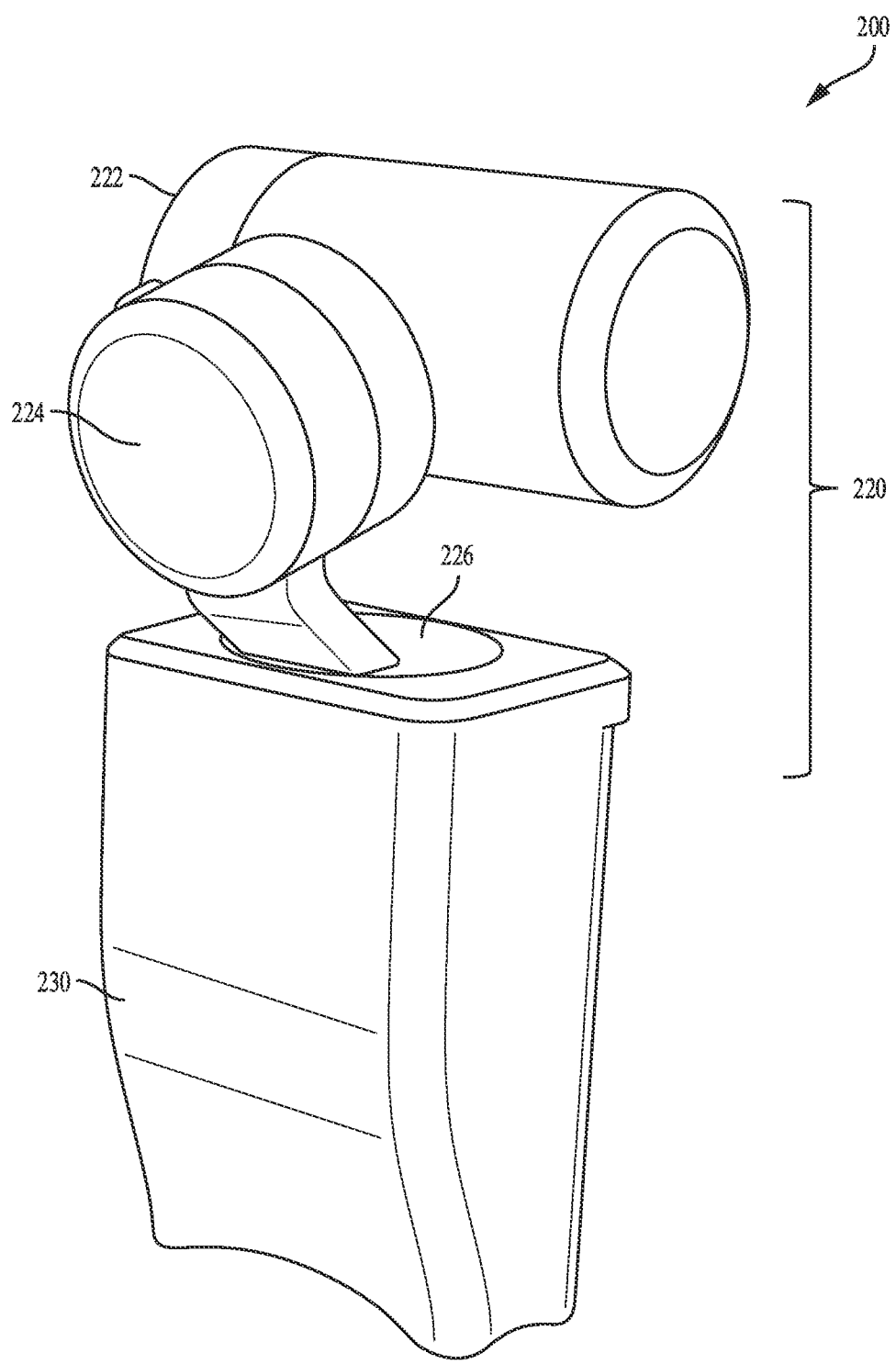
FIG. 2B is a pictorial illustration of an example of an image capture module from a second perspective.

FIGS. 2A and 2B are pictorial illustrations of an example of an image capture module 200 from two perspectives. The image capture module 200 includes an image sensor 210 configured to capture images; a mechanical stabilization system 220, including gimbals and motors (222, 224, and 226); and a connector 230 configured to interchangeably connect the mechanical stabilization system to an aerial vehicle (e.g., the aerial vehicle 120) and a handheld module (e.g., the handheld module 130).

The image capture module 200 includes an image sensor 210 configured to capture images (e.g., still images or frames of video). The image sensor 210 may be configured to detect light of a certain spectrum (e.g., the visible spectrum or the infrared spectrum) and convey information constituting an image as electrical signals (e.g., analog or digital signals). For example, the image sensor 210 may include charge-coupled devices (CCD) or active pixel sensors in complementary metal-oxide-semiconductor (CMOS). The image capture module 200 includes a lens 212 (e.g., a wide-angle rectilinear lens). The image sensor 210 detects light from the environment that is incident through the lens 212.

The image capture module 200 may also include a processing apparatus (e.g., including memory, an image signal processor, a hardware encoder, a microcontroller, and/or other processor) that is configured to track a user based on position data from a beacon module (e.g., the beacon module 150) and/or based on computer vision tracking of the user in images from the image sensor 210 in a first usage scenario, where the image capture module 200 is attached to an aerial vehicle (e.g., the aerial vehicle 500), and/or in a second usage scenario, where the image capture module 200 is attached to an handheld module (e.g., the handheld module 300). In some implementations, the processing apparatus may be configured to perform image processing operations (e.g., correction of dead pixels, band processing, decoupling of vertical blanking, spatial noise reduction, temporal noise reduction, automatic white balance, global tone mapping, local tone mapping, lens distortion correction, electronic rolling shutter correction, electronic image stabilization, output projection, and/or encoding) on images captured by the image sensor 210. In some implementations, some or all of the image processing operations are performed on the images captured by the image sensor by a processing apparatus that is located in whole or in part in another component of a larger movable imaging system 100. For example, the processing apparatus may be located inside the connector 230 below the gimbal 226 of the mechanical stabilization system 220.

The image capture module 200 includes a mechanical stabilization system 220, including gimbals and motors (222, 224, and 226) (e.g., corresponding to pitch, yaw, and roll respectively), that is integrated with the image sensor 210 in the image capture module 200 and configured to control an orientation of the image sensor 210. For example, the gimbals and motors (222, 224, and 226) may enable rotation of the image sensor with three degrees of freedom. In some implementations, the gimbals and motors (222, 224, and 226) respectively enable a wide range of rotation angles (e.g., up to 180 degrees, 270 degrees or 360 degrees). A gimbal 226 of the mechanical stabilization system 220 is substantially flush with a surface of the connector 230 causing the mechanical stabilization system 220 to have a low profile and protect the gimbal 226 from damage. In some implementations, the gimbal 226 is contained entirely within a body of the connector 230, at or below the grade of an outer surface of the connector 230. For example, the mechanical stabilization system 220 may be controlled with a controller (e.g., a proportional integral derivative controller) based on target orientations determined by a processing apparatus based on image data from the image sensor 210, motion sensor data from a motion sensor in the image capture module 200 or moving platform (e.g., the aerial vehicle 120 or the handheld module 130) to which the image capture module 200 module is attached, and/or position data for a tracking target from a beacon (e.g., the beacon module 150).

The mechanical stabilization system 220 may be configured to enable an electronically actuated transport mode. When many 3-axis gimbals are powered off they simply float around aimlessly and are cumbersome to put away or transport. In some implementations, the mechanical stabilization system 220 is configured to enable an electronically actuated transport mode in which: upon the occurrence of triggering event (e.g., a specialized user command or a command to power OFF the image capture module 200 or the mechanical stabilization system 220, each of the gimbals and motors (222, 224, and 226) are electronically controlled to assume a fold-flat position and maintain that position for a fixed time period (e.g., 10, 30, or 60 seconds), allowing the user to easily slip the image capture module 200 into a pocket, carrying case, backpack, or other container. After the time has expired, the mechanical stabilization system 220 will completely power OFF allowing the gimbal arms to move freely, once in the desired transport location. In some implementations, this electronically actuated transport mode can be accompanied by a physical lock which is either integrated into the gimbal itself, or via an external means such as a bracket or carrying case. For example, the electronically actuated transport mode may be implemented using electronic motor position sensors, mechanical fold-flat ability (range-of-motion), and firmware control (e.g., implemented in a processing apparatus of the image capture module 200).

The image capture module 200 includes a connector 230 configured to interchangeably connect the mechanical stabilization system 220 to an aerial vehicle (e.g., the aerial vehicle 120) in a first usage scenario and a handheld module in a second usage scenario (e.g., the handheld module 130). The connector may be keyed to a slot of the aerial vehicle and keyed to a slot of the handheld module. The connector 230 is keyed by virtue of the shape of an outer surface of the connector 230, which is fitted to the corresponding shape of the slot in the aerial vehicle (e.g., the aerial vehicle 500) and the corresponding shape in the slot of the handheld module (e.g., the handheld module 300). The keyed shape of the connector 230 includes some asymmetry (i.e., the rectangular cross-section of the connector 230 that narrows, sloping inward, about half way down the connector 230 on one side), which may facilitate easy connection of the aerial vehicle and the handheld module to the image capture module 200 by preventing a user from accidentally inserting the connector 230 in an improper orientation. For example, the connector 230 may include a first fastening mechanism and a second fastening mechanism configured to secure the connector 230 when the image capture module 200 is attached to the handheld module. The fastening mechanisms may be configured such that either of the first fastening mechanism and second fastening mechanism is sufficient to secure the connector 230. The connector 230 includes an electrical connector (e.g., a universal serial bus (USB) type C connector) nested inside of the keyed outer portion of the connector 230. The electrical connector may include multiple conductors that can be used to provide power from a movable platform (e.g., the aerial vehicle 500 or the handheld module 300) to the image capture module 200 and transfer communication signals (e.g., USB 2.0, USB 3.0, I2C, SPI, and/or MIPI signals) between the movable platform and the image capture module 200 when they are connected. In some implementations, the connector 230 includes pairs of conductors respectively used to transfer power to the image capture module 200, bulk transfer data from the image capture module 200, transfer control signals to the image capture module 200, and transfer real-time video data from the image capture module 200.

The connector may include an electrical connector (e.g., a universal serial bus (USB) type C connector) nested inside of the keyed outer portion of the connector. The electrical connector may include multiple conductors that can be used to provide power from the aerial vehicle 120 to the image capture module 110 and transfer communication signals (e.g., USB 2.0, USB 3.0, I2C, SPI, and/or MIPI (Mobile Industry Processor Interface) signals) between the aerial vehicle 120 and the image capture module 110 when they are connected. For example, conductors of the connection may be used to transfer power, high-speed bulk data transfers, real-time embedded control signaling, and/or raw video signals at a capture frame rate. For example, the connector may include pairs of conductors respectively used to transfer power to the image capture module 110, bulk transfer data from the image capture module 110, transfer control signals to the image capture module 110, and transfer real-time video data from the image capture module 110.

In the example of FIGS. 2A and 2B, the gimbal 226 of the mechanical stabilization system 220 is substantially flush with a surface of the connector 230. The gimbal 226 may be protected by a body of the connector 230 to protect the gimbal from damage and/or the ingress of dust. For example, gimbal 226 may be a roll gimbal and with a corresponding roll motor with a roll motor housing that is built into the housing of the connector 230 so that the roll motor housing sits below the grade of an outer surface of the connector 230 and is hidden and/or protected. This configuration may provide advantages over other mechanical stabilization systems with all of their gimbals exposed (e.g., three axis gimbals exposed, including a roll axis motor housing sitting on top of a main housing). For example, locating the gimbal 226 within the connector 230 and/or substantial flush with a surface of the connector 230 may reduce amount of exposed gimbal parts, reduce height of gimbal above a main housing, and/or simplify the overall design by reducing the number visible motor elements (e.g., from three gimbals two gimbals).

Figure 3A:
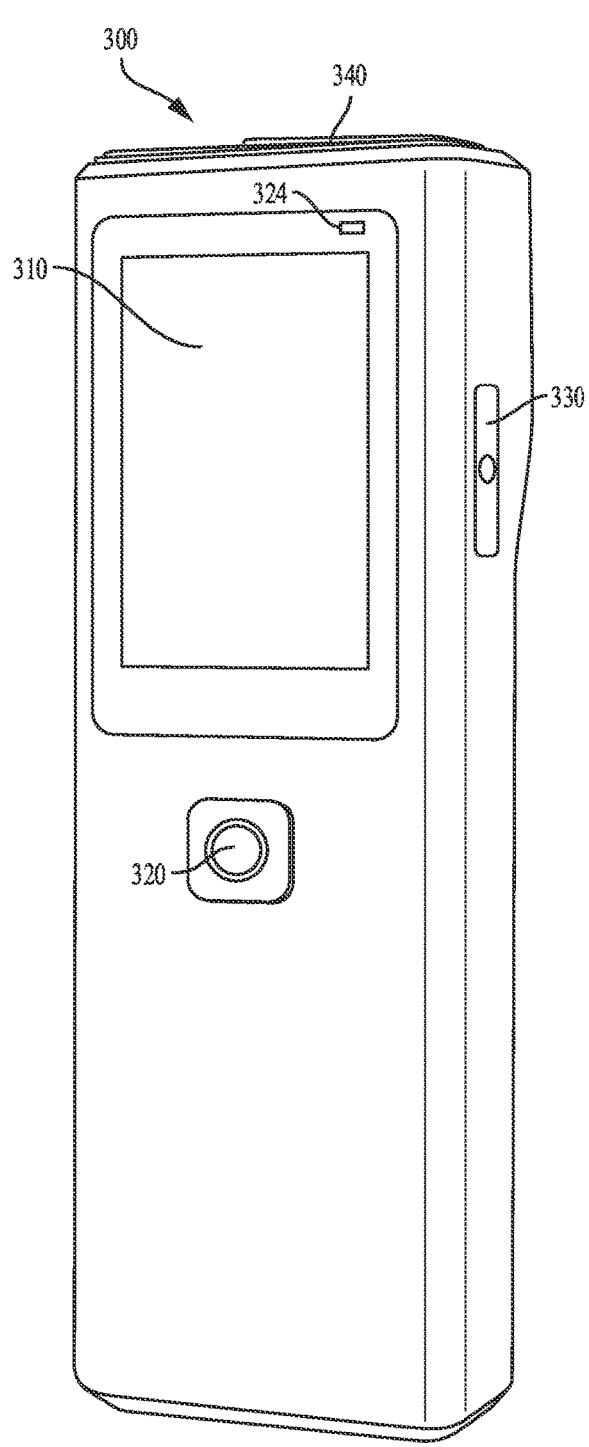
FIG. 3A is a pictorial illustration of an example of a handheld module from a first perspective.
Figure 3B:
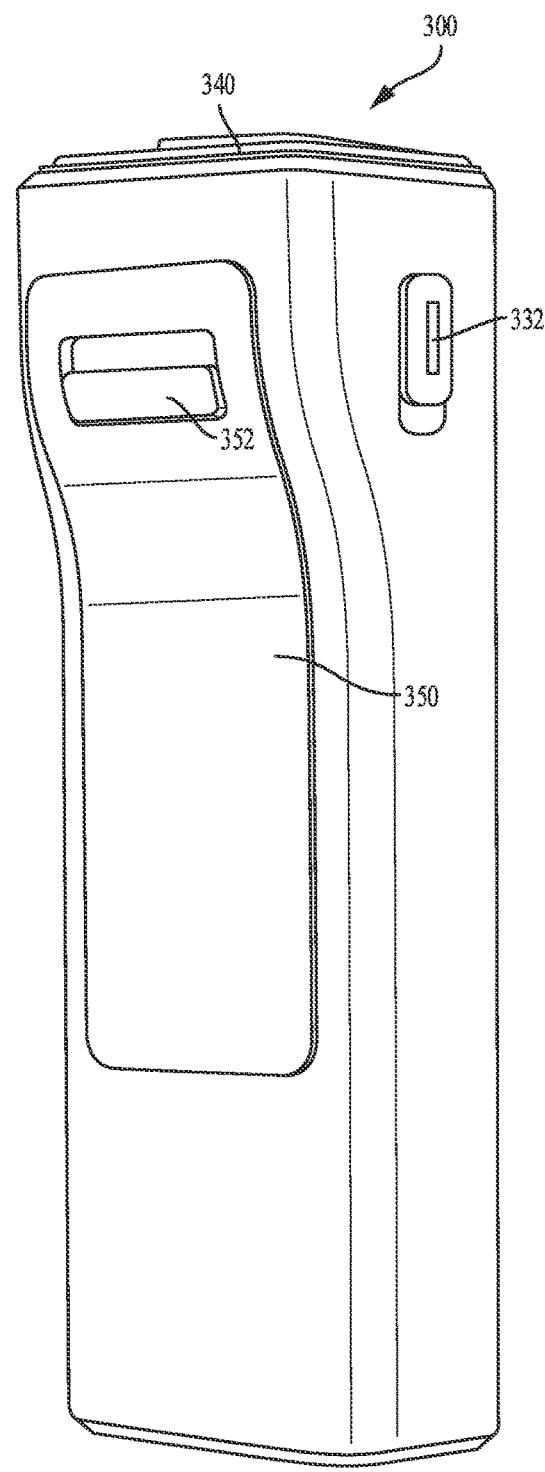
FIG. 3B is a pictorial illustration of an example of a handheld module from a second perspective.

FIGS. 3A and 3B are pictorial illustrations of an example of a handheld module 300 from two perspectives. The handheld module 300 includes a display 310, a record button 320, a status indicator light 324, a first fastening mechanism 330 and a second fastening mechanism 332, a slot 340 with a shape matched to the connector 230 of the image capture module 200, and a battery cover 350 with a battery release latch 352.

The handheld module 300 may be shaped such that it may be ergonomically held in a hand during use while operating a touch display and/or a button (e.g., the record button 320) of the handheld module 300. The outer material may be selected to have a rubbery grip texture.

The handheld module 300 includes a user interface that allows a user to control image capture with an attached image capture module (e.g., the image capture module 200). The user interface includes the display 310 for viewing captured images, the record button 320 for snapping still images or starting or stopping recording of video, and the status indicator light 324. The status indicator light 324 may include a multi-color LED device and may reflect the status of an electronic connection to an attached image capture module and/or a recording state. In some implementations, the display 310 is a touch-screen that enables the input of additional commands by a user. For example, a user may input commands to change a gimbal angle; enter "selfie-mode," or "HiLight Tag" by voice command and/or input received via the touch interface of the display 310 and/or a button of the handheld module 300. A "selfie-mode" function may rotate the gimbal 226 (e.g., rotate 180 degrees), such that an image sensor (e.g., the image sensor 210) faces the same direction as the display 310. A "HiLight Tag"

function may enable a user to mark an image or frames of video as significant with metadata. For example, a "High-Light Tag" gesture may be defined for a touch screen interface of the display 310, which may enable a user to generate portions of a video data temporally and/or spatially by specifying an object or other portions of a frame as frames are displayed on the display 310.

The first fastening mechanism 330 and the second fastening mechanism 332 are configured to secure the connector 230 of the image capture module 200 when it is inserted in the slot 340 to attach the handheld module 300 to the image capture module 200. The first fastening mechanism 330 and the second fastening mechanism 332 include a button and a slider, respectively, that may be used to disengage the first fastening mechanism 330 and the second fastening mechanism 332 in order to disconnect from and attached image capture module (e.g., the image capture module 200). Other types of fastening mechanisms are also possible.

The battery cover 350 may be opened using the battery release latch 352 to access a battery of the handheld module 300 for replacement or recharging. For example, multiple batteries may be used and swapped into the handheld module 300 to enable continued use while one of the batteries is charged in an external charger.

Figure 4A:
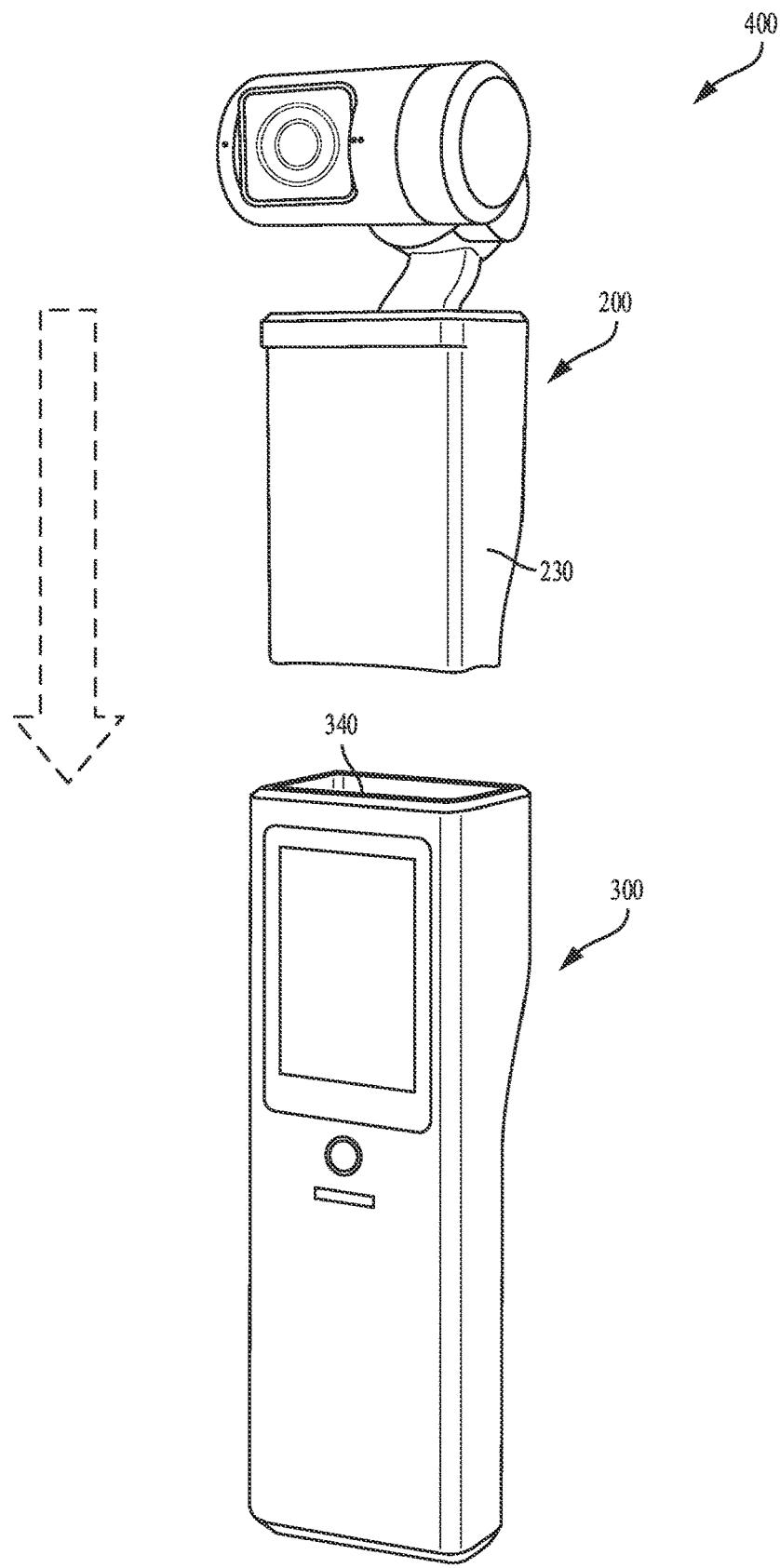
FIG. 4A is a pictorial illustration of an example of a handheld module oriented to be connected to an image capture module.

FIG. 4A is a pictorial illustration of an example of a handheld module 300 oriented to be connected to an image capture module 200 to form a movable imaging assembly 400. The connector 230 of the image capture module 200 is keyed to the slot 340 of the handheld module 300. From the illustrated orientation, the image capture module 200 may be moved down to slide the connector 230 into the slot 340 to attach the image capture module 200 to the handheld module 300 to form the movable imaging assembly 400. When the connector 230 is inserted into the slot 340, paired fastening mechanisms (e.g., latches) in the connector 230 and the slot 340 may engage to secure the newly formed connection. For example, spring loaded latches may engage to secure the connection of the movable imaging assembly 400. As part of the connection, mated electronic connectors (e.g., USB Type C connectors) nested in the connector 230 and the slot 340 may engage to form an electronic connection including multiple conductors, which may be used to supply power from the handheld module 300 to image capture module 200 and to transfer control signals and data (e.g., image data) between the attached modules of the movable imaging assembly 400.

When a user seeks to disconnect the handheld module 300 from the image capture module 200, they may release these fastening mechanisms. For example, latches may be manually released by a user using their fingers on buttons or release levers. In some implementations, two latches must be simultaneously released in order to disconnect the handheld module 300 from the image capture module 200, which may reduce the risk of accidental disconnection. For example, a cycle of connecting and disconnecting the handheld module 300 from the image capture module 200 may only take a few seconds for a user to complete.

Figure 4B:
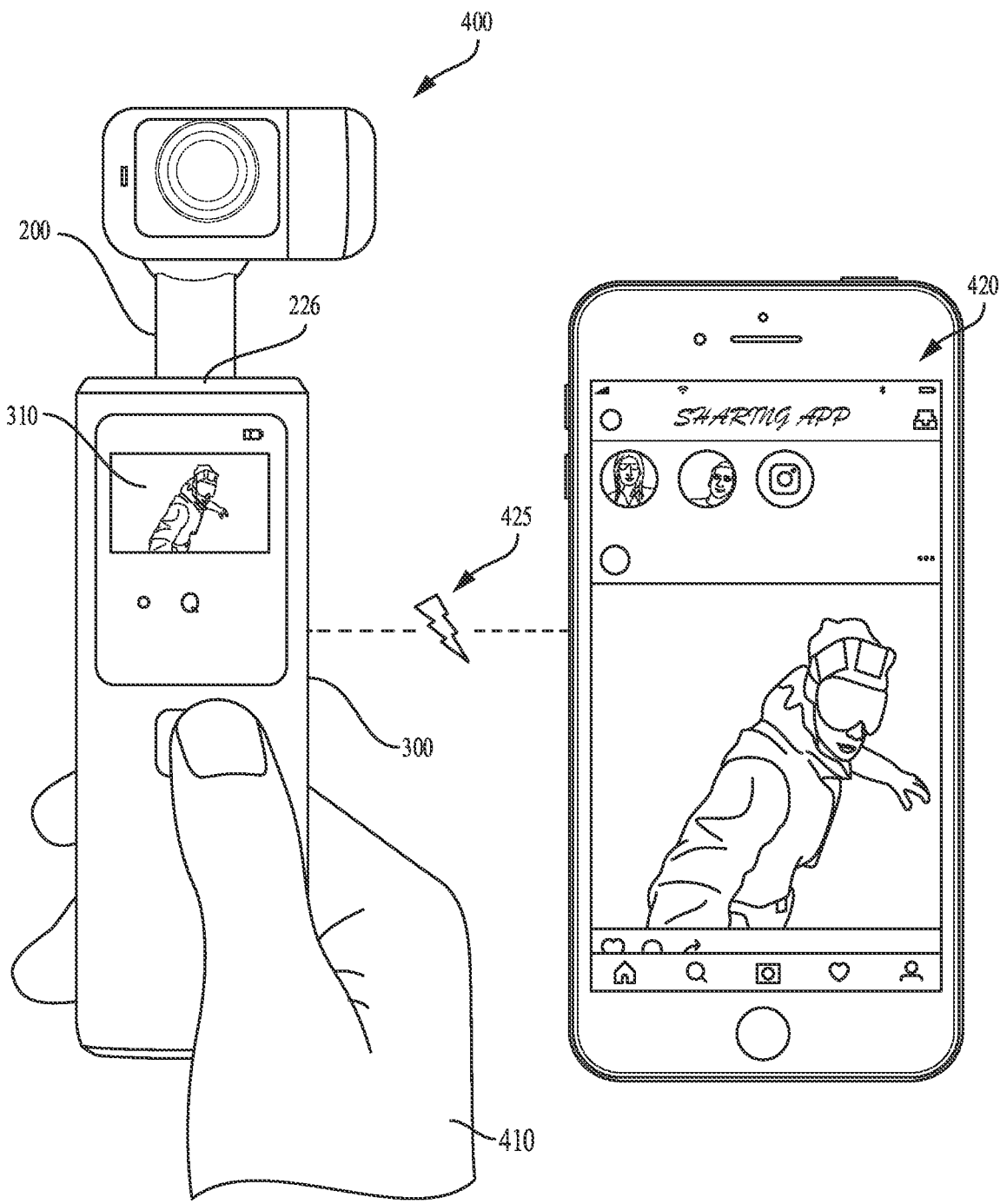
FIG. 4B is a pictorial illustration of an example of a movable imaging assembly in communication with a personal computing device.

FIG. 4B is a pictorial illustration of an example of a movable imaging assembly 400 in communication with a personal computing device 420. In the usage scenario of FIG. 4B, the movable imaging assembly 400 is held in a hand 410 of a user and is capturing images (e.g., still images or frames of video) of the user. The captured images are displayed on the display 310 of the handheld module 300. The captured images may be transferred to the personal computing device 420 (e.g., a smartphone) via a wireless link 425 (e.g., using a Bluetooth link or a Wi-Fi link). The personal computing device 420 may then be used to display and/or share or otherwise transmit and distribute the captured images. The personal computing device 420 may also be configured with an application that may be used to remotely control image capture functions of the movable imaging assembly 400 and/or update software installed on a processing apparatus of the movable imaging assembly 400.

In this example, a gimbal 226 of the mechanical stabilization system is substantially flush with a surface (e.g., the top surface) of the handheld module 300 when the image capture module 200 is attached to the handheld module 300. This may result in the mechanical stabilization system and the image sensor having a low profile and protecting the gimbal 226 to reduce risk of damage to the gimbal 226. This configuration may provide advantages over other mechanical stabilization systems with all of their gimbals exposed (e.g., three axis gimbals exposed, including a roll axis motor housing sitting on top of a main housing). For example, locating the gimbal 226 within the handheld module 300 and/or substantial flush with a surface of the handheld module 300 when the image capture module 200 is attached to the handheld module 300 may reduce amount of exposed gimbal parts, reduce height of gimbal above a main housing, and/or simplify the overall design by reducing the number visible motor elements (e.g., from three gimbals two gimbals).

Figure 5A:
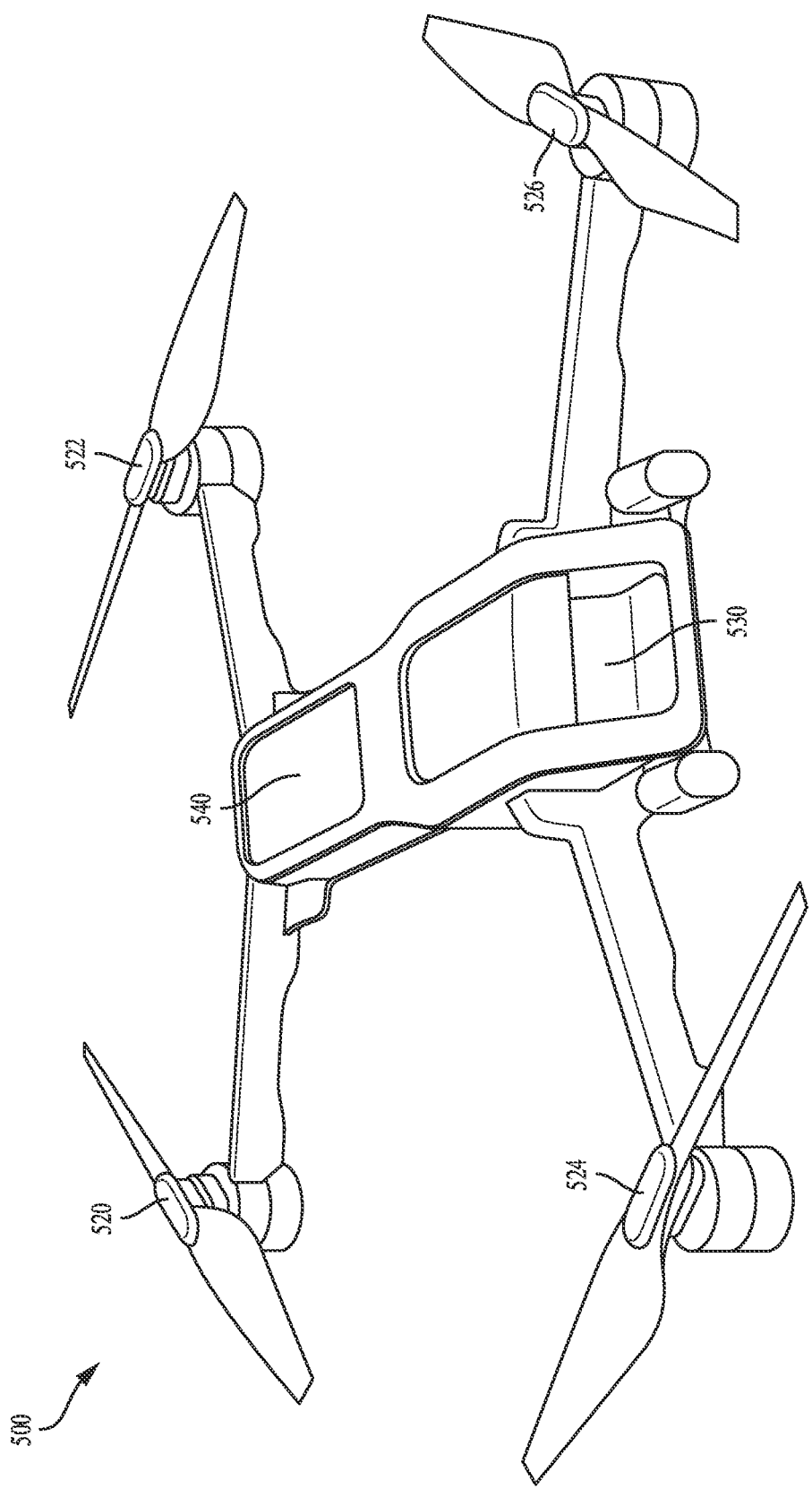
FIG. 5A is a pictorial illustration of an example of an aerial vehicle.

FIG. 5A is a pictorial illustration of an example of an aerial vehicle 500. In this example, the aerial vehicle 500 is quadcopter drone. The aerial vehicle 500 includes four propellers (520, 522, 524, and 526); a slot 530 that is shaped to match the connector 230 of the image capture module 200; and a detachable flight battery 540. The propellers (520, 522, 524, and 526) are control surfaces that may be controlled via respective motors to control the motion of the aerial vehicle 500. For example, the aerial vehicle 500 may include an electrical connector (e.g., a USB type C connector) nested in the slot 530 that includes multiple conductors configured to transfer images and other data and control signals between the aerial vehicle 500 and the image capture module 200 when they are attached by inserting the connector 230 in the slot 530. In some implementations, the detachable flight battery 540 may be charged quickly with a high speed AC charging station when the detachable flight battery 540 is removed from the aerial vehicle 500

Figure 5B:
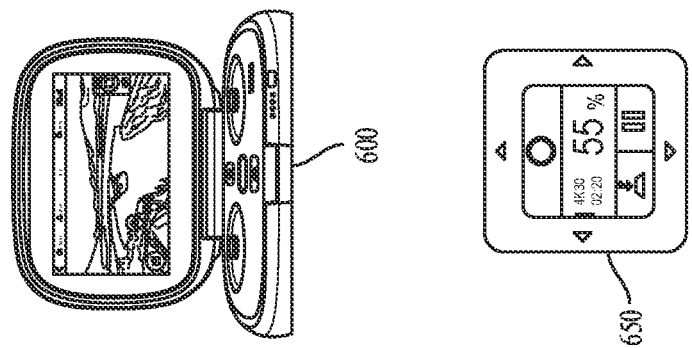
FIG. 5B is a pictorial illustration of an example of a movable imaging assembly in communication with a controller module and a beacon module.
Figure 5B:
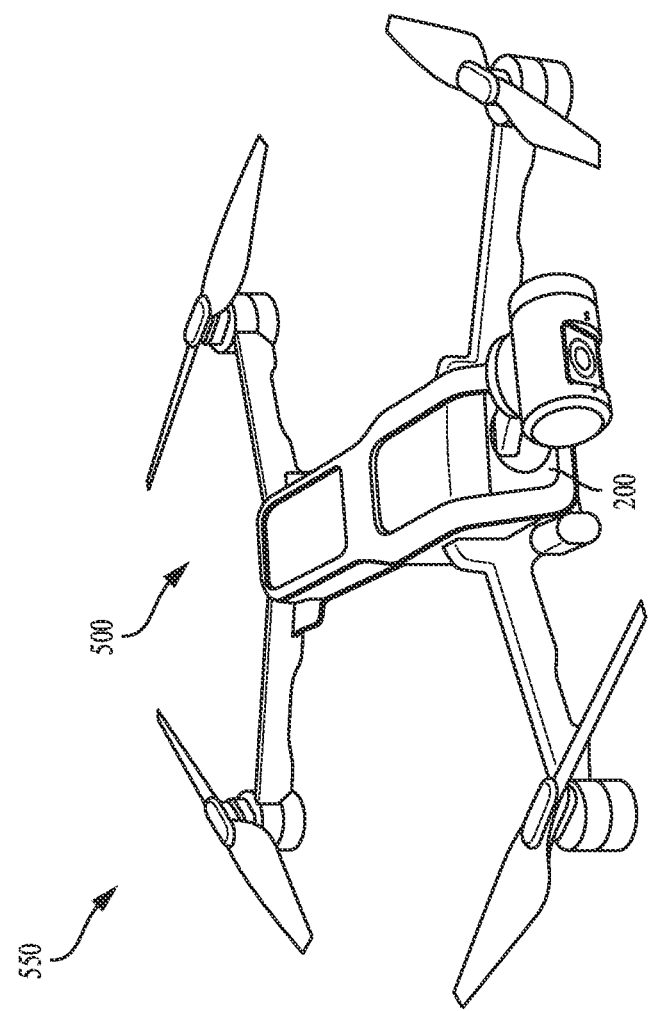

FIG. 5B is a pictorial illustration of an example of a movable imaging assembly 550 in communication with a controller module 600 and a beacon module 650. The movable imaging assembly 550 is formed when the image capture module 200 is attached to the aerial vehicle 500 by inserting the connector 230 into the slot 530. When the connector 230 is inserted into the slot 530, paired fastening mechanisms (e.g., latches) in the connector 230 and the slot 530 may engage to secure the newly formed connection. For example, spring loaded latches may engage to secure the connection of the movable imaging assembly 550. As part of the connection, mated electronic connectors (e.g., USB Type C connectors) nested in the connector 230 and the slot 530 may engage to form an electronic connection including multiple conductors, which may be used to supply power from the aerial vehicle 500 to the image capture module 200 and to transfer control signals and data (e.g., image data) between the attached modules of the movable imaging assembly 550.

When a user seeks to disconnect the aerial vehicle 500 from the image capture module 200, they may release these fastening mechanisms. For example, latches may be manually released by a user using their fingers on buttons or release levers. In some implementations, two latches must be simultaneously released in order to disconnect the aerial vehicle 500 from the image capture module 200, which may reduce the risk of accidental disconnection. For example, a cycle of connecting and disconnecting the aerial vehicle 500 from the image capture module 200 may only take a few seconds for a user to complete.

The movable imaging assembly 550 may be in communication via wireless links with the controller module 600 and the beacon module 650. In some implementations, the movable imaging assembly 550 is configured to communicate wirelessly with both the beacon module 650 and the controller module 600. Communicating with both the beacon module 650 and the controller module 600 may allow a first user to actively monitor and/or control image capture of the images by the movable imaging assembly 550 from the controller module 600 while the movable imaging assembly 550 follows a second user or other object that is bearing the beacon module 650 passively while moving. This may enable following objects (e.g., animals) that are unable to issue commands to the movable imaging assembly 550 or make the experience of being followed more natural and less mentally taxing for the second user, so the second user can focus their attention on other activities (e.g., skiing, surfing, or mountain biking). The first user can focus on optimizing other aspects of image capture (e.g., choosing perspective on the subject, zooming, or timing snaps of still images) while autonomous functions of the movable imaging assembly 550 handle the following and navigation tasks.

Figure 6A:
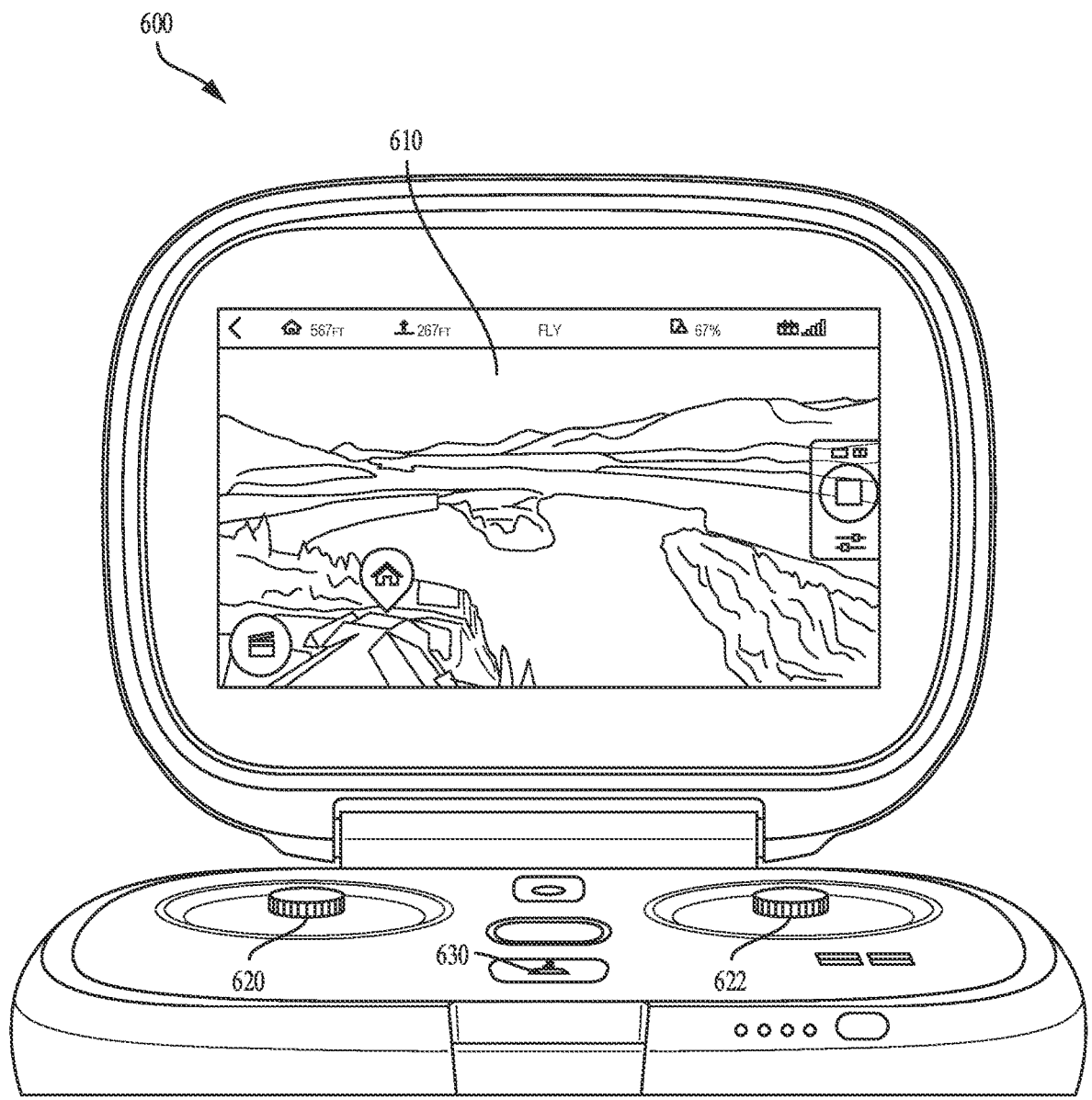
FIG. 6A is a pictorial illustration of an example of a controller module.

FIG. 6A is a pictorial illustration of an example of a controller module 600. The controller module 600 may be configured to wirelessly communicate with a movable imaging assembly (e.g., the movable imaging assembly 400 or the movable imaging assembly 550) to control motion of the movable imaging assembly and/or capture of images. The controller module 600 includes a display 610 configured to present images captured by the movable imaging assembly and status information for the movable imaging assembly. For example, the status information for the movable imaging assembly may include a battery remaining indicator, a video recording indicator, an encoding state (e.g., 4K video at 30 frames per second and a recording time), a flight mode (e.g., leash mode, mimic mode, or tripod mode), flight event notices, and/or user prompts. The display 610 may be a touch-screen display that enables the entry of commands (e.g., to select a subject/target for tracking from an image displayed on the display 610). The controller module 600 includes a left joystick 620 and a right joystick 622 for controlling motion of the movable imaging assembly and/or panning of an image sensor (e.g., the image sensor 210) using a mechanical stabilization system (e.g., the mechanical stabilization system 220) of the movable imaging assembly. The controller module 600 includes buttons 630 including, for example, a power button and a record button. The controller module 600 may also include a microphone for receiving voice commands to be relayed to the movable imaging assembly.

Figure 6B:
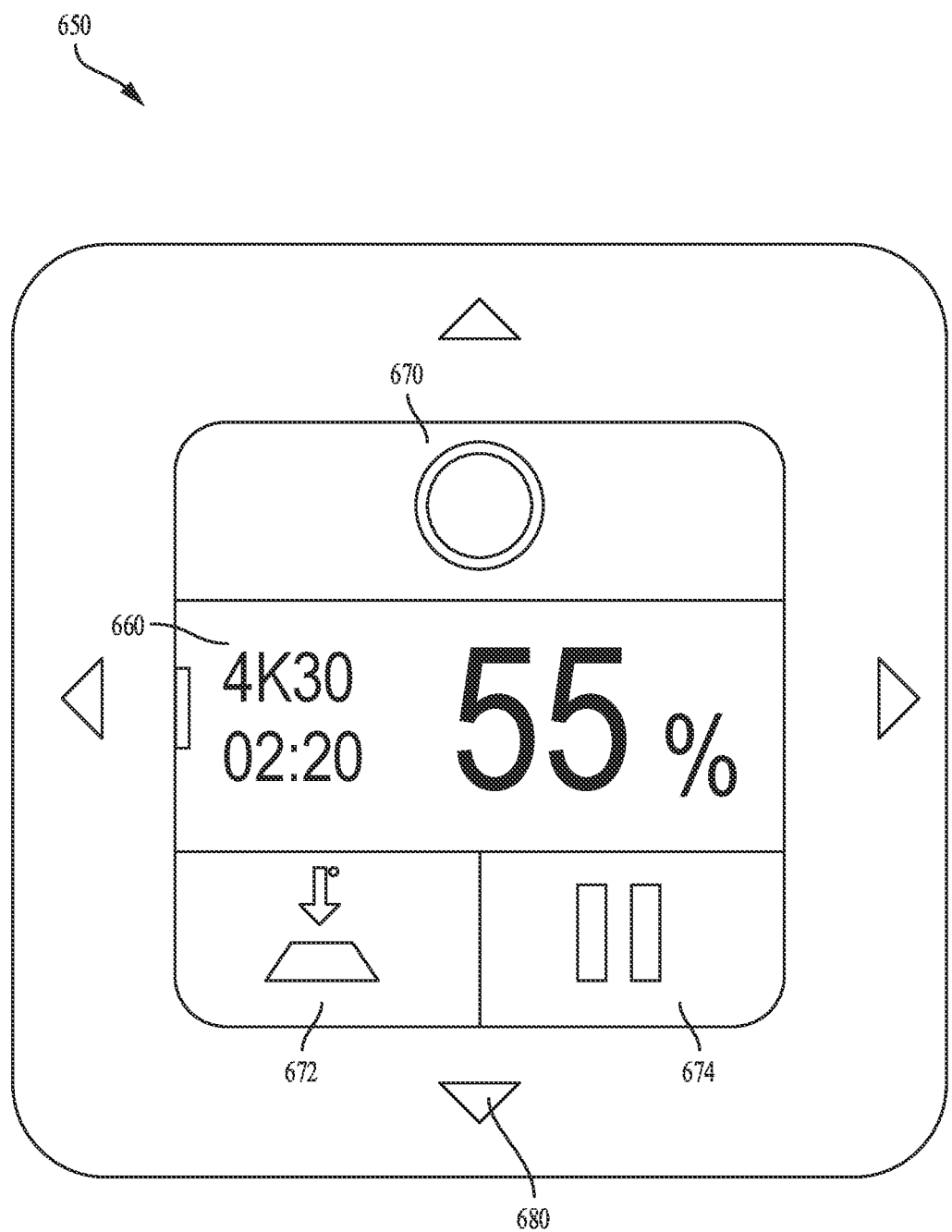
FIG. 6B is a pictorial illustration of an example of a beacon module.

FIG. 6B is a pictorial illustration of an example of a beacon module 650. The beacon module 650 may be configured to wirelessly transmit position data to a movable imaging assembly (e.g., the movable imaging assembly 400 or the movable imaging assembly 550) to enable the movable imaging assembly to follow the beacon module 650. The position data may be transmitted via a wireless communications link. For example, the beacon module 650 may include a location sensor, such as a GPS receiver and the position data may include GPS coordinates of the beacon module 650. In some implementations, beacon module 650 includes an inertial measurement unit (e.g., including accelerometers, gyroscopes, and/or magnetometers) and the position data includes changes in the position and/or orientation of the beacon module 650 that are sensed by the inertial measurement unit. For example, the wireless communications link may utilize a wireless interface standard, such as WiFi, Bluetooth (BT), cellular data link, ZigBee, or ANT+. The beacon module 650 may be waterproof and/or include a waterproof housing to enable users to bear the beacon module 650 in a variety of usage scenarios.

The beacon module 650 includes a user interface that allows a user to monitor status of the movable imaging assembly (e.g., the movable imaging assembly 400 or the movable imaging assembly 550) and/or issue some commands to the movable imaging assembly via the wireless communications link to cause the movable imaging assembly to move and/or capture images. The beacon module 650 includes a display 660 for presenting status information for the movable imaging assembly. For example, the status information for the movable imaging assembly may include a battery remaining indicator, a video recording indicator, an encoding state (e.g., 4K video at 30 frames per second and a recording time), a flight mode (e.g., leash mode, mimic mode, or tripod mode), flight event notices, and/or user prompts. The beacon module 650 includes a record button 670 to start and stop the capture of images. The beacon module 650 includes a take-off/land button 672 to instruct an aerial vehicle (e.g., the aerial vehicle 500) to take-off or land, depending on the current flight state. The beacon module 650 includes a "pause follow" button 674 to pause and resume a follow function (e.g., by entering or leaving a tripod follow mode where the movable platform maintains its current position, but may still track motions of a subject by panning with a mechanical stabilization system). The beacon module 650 includes buttons 680 for 3-D repositioning of the movable imaging assembly relative to the subject bearing the beacon module 650. The beacon module 650 may also include a microphone for receiving voice commands (e.g., "follow-me," "pause," and "record").

Figure 7B:
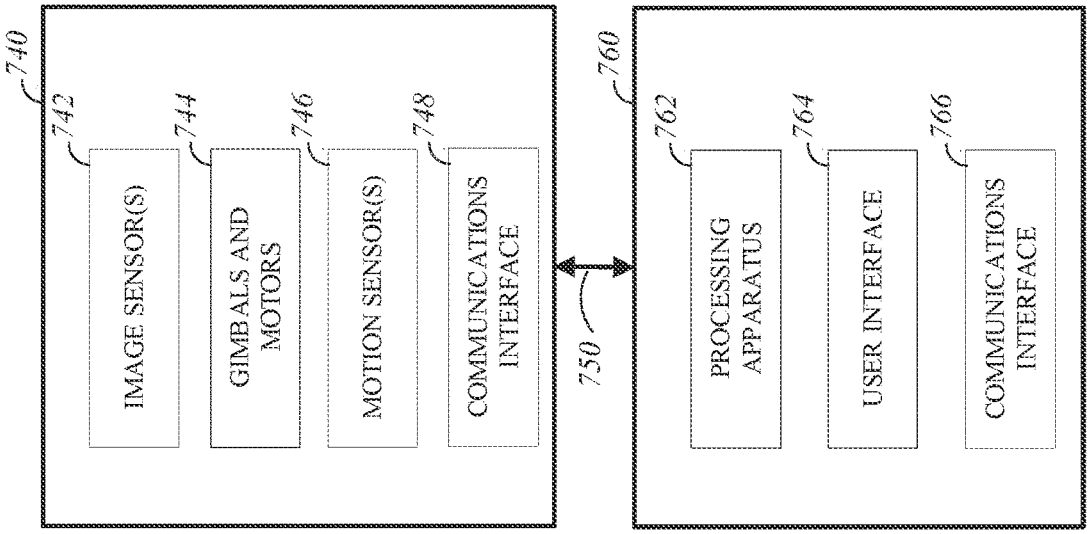
FIG. 7B is a block diagram of an example of a system configured for image capture.
Figure 7A:
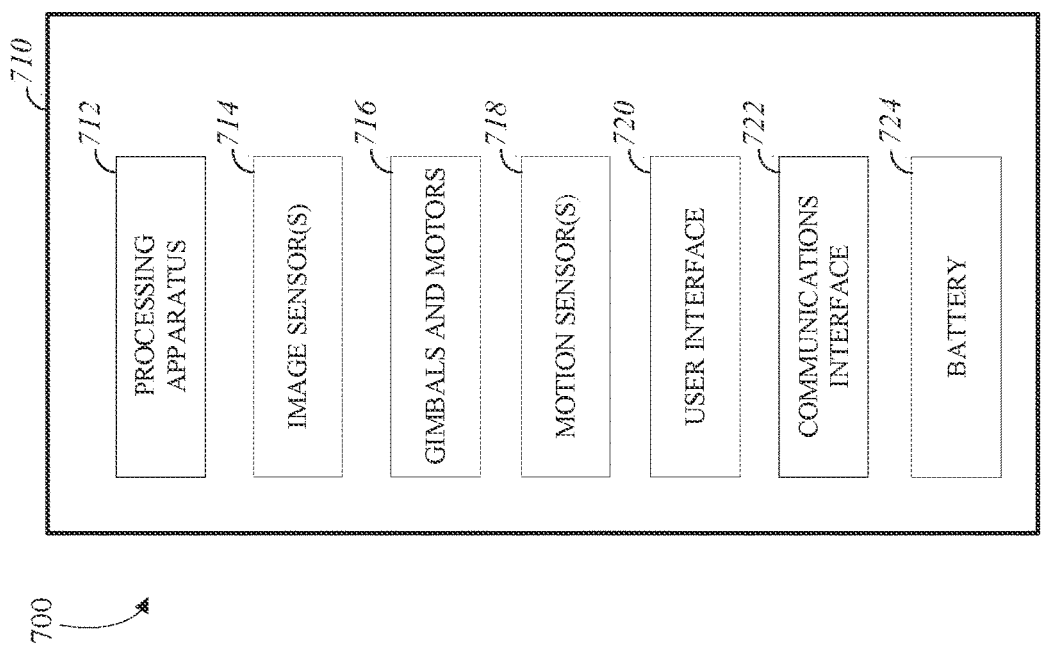
FIG. 7A is a block diagram of an example of a system configured for image capture.

FIG. 7A is a block diagram of an example of a system 700 configured for image capture. The system 700 includes an image capture device 710 (e.g., the movable imaging assembly 160 or the movable imaging assembly 162) that includes a processing apparatus 712 that is configured to receive images from one or more image sensors 714. The image capture device 710 includes gimbals and motors 716 that are actuators of a mechanical stabilization system configured to control an orientation of the one or more image sensors 714 (e.g., an orientation with respect to a movable platform). The gimbals and motors 716 may be controlled by a controller of the mechanical stabilization system, which may be implemented by the processing apparatus 712 (e.g., as a software module or a specialized hardware module). The processing apparatus 712 may be configured to perform image signal processing (e.g., filtering, tone mapping, stitching, electronic image stabilization, and/or encoding) to generate output images based on image data from the one or more image sensors 714. The image capture device 710 includes one or more motion sensors 718 configured to detect motion of the one or more image sensors 714. The one or more motion sensors 718 may provide feedback signals to the mechanical stabilization system. The image capture device 710 includes a communications interface 722 for transferring images to other devices and/or receiving commands or other control signaling. The image capture device 710 includes a user interface 720, which may allow a user to control image capture functions and/or view images. The image capture device 710 includes a battery 724 for powering the image capture device 710. For example, the system 700 may be used to implement processes described in this disclosure, such as the process 800 of FIG. 8, the process 900 of FIG. 9, and the process 1000 of FIG. 10.

The processing apparatus 712 may include one or more processors having single or multiple processing cores. The processing apparatus 712 may include memory, such as random access memory device (RAM), flash memory, or any other suitable type of storage device such as a non-transitory computer readable memory. The memory of the processing apparatus 712 may include executable instructions and data that can be accessed by one or more processors of the processing apparatus 712. For example, the processing apparatus 712 may include one or more DRAM modules such as double data rate synchronous dynamic random-access memory (DDR SDRAM). In some implementations, the processing apparatus 712 may include a digital signal processor (DSP). In some implementations, the processing apparatus 712 may include an application specific integrated circuit (ASIC). For example, the processing apparatus 712 may include a custom image signal processor. In some implementations, the processing apparatus 712 may have multiple processing units in different portions the image capture device 710. For example, the processing apparatus 712 may include a processor on a movable platform (e.g., the aerial vehicle 120, the handheld module 130, the handheld module 300, or the aerial vehicle 500) and a processor in an image capture module (e.g., the image capture module 110 or the image capture module 200) that are removably attached by a connector.

The one or more image sensors 714 are configured to capture images. The one or more image sensors 714 are configured to detect light of a certain spectrum (e.g., the visible spectrum or the infrared spectrum) and convey information constituting an image as electrical signals (e.g., analog or digital signals). For example, the one or more image sensors 714 may include charge-coupled devices (CCD) or active pixel sensors in complementary metal-oxide-semiconductor (CMOS). The one or more image sensors 714 may detect light incident through respective lens (e.g., a rectilinear lens or a fisheye lens). In some implementations, the one or more image sensors 714 include analog-to-digital converters. In some implementations, the one or more image sensors 714 have respective fields of view that overlap.

The mechanical stabilization system for the one or more image sensors 714 includes the gimbals and motors 716. The gimbals and motors 716 may be parts of a mechanical stabilization system (e.g., the mechanical stabilization system 220). The gimbals and motors 716 may attach the one or more image sensors 714 to a movable platform (e.g., the aerial vehicle 120 or the handheld module 130) via a connector (e.g., the connector 230) and control their orientation. The gimbals and motors 716 may span multiple axes (e.g., a 7-axis gimbal set with brushless direct current motors). The mechanical stabilization system may include a controller (e.g., a proportional integral derivative (PID) controller). For example, the controller of the mechanical stabilization system may be implemented by the processing apparatus 712 (e.g., as a software module or a specialized hardware module).

The one or more motion sensors 718 are configured to detect motion of the one or more image sensors 714. For example, the one or more motion sensors 718 may include parts of an inertial measurement unit (e.g., including gyroscopes, accelerometers, and/or magnetometers) that is mounted in a housing with the one or more image sensors 714. In some implementations, the one or more motion sensors 718 may include parts of an inertial measurement unit that is mounted in a movable platform (e.g., the aerial vehicle 120 or the handheld module 130) of the image capture device 710. In some implementations, the one or more motion sensors 718 includes sensors (e.g., magnetic encoders, optical encoders, and/or potentiometers) that detect the state of the gimbals and motors 716 to measure a relative orientation of the image sensor and a movable platform of the image capture device 710. For example, the one or more motion sensors 718 may include encoders configured to detect a position and orientation of the image sensor relative to a movable platform (e.g., the aerial vehicle 120 or the handheld module 130). The processing apparatus 712 may be configured to determine a sequence of orientation estimates based on sensor data from the one or more motion sensors 718. For example, determining the sequence of orientation estimates may include applying quadratic estimation to sensor data from a plurality of the one or more motion sensors 718. In some implementations, the motion sensors include a GPS receiver that generates GPS position data for the image capture device 710.

The image capture device 710 may include a user interface 720. For example, the user interface 720 may include an LCD display for presenting images and/or messages to a user. For example, the user interface 720 may include a touch-screen display for interactively displaying images and other data and receiving user commands. For example, the user interface 720 may include a microphone for receiving voice commands from a user. For example, the user interface 720 may include a button or switch enabling a person to manually turn the image capture device 710 on and off. For example, the user interface 720 may include a shutter button for snapping pictures.

The image capture device 710 may include a communications interface 722, which may enable communications with a personal computing device (e.g., a smartphone, a tablet, a laptop computer, or a desktop computer) and one or more specialized controllers (e.g., the controller module 140 and/or the beacon module 150). For example, the communications interface 722 may be used to receive commands controlling image capture and processing in the image capture device 710. For example, the communications interface 722 may be used to transfer image data to a personal computing device or a specialized controller controllers (e.g., the controller module 140). For example, the communications interface 722 may include a wired interface, such as a high-definition multimedia interface (HDMI), a universal serial bus (USB) interface, or a FireWire interface. For example, the communications interface 722 may include a wireless interface, such as a Bluetooth interface, a ZigBee interface, and/or a Wi-Fi interface.

The image capture device 710 may include a battery 724 that powers the image capture device 710 and/or its peripherals. For example, the battery 724 may be a detachable flight battery for an aerial vehicle. For example, the battery 724 may be a part of a handheld module. For example, the battery 724 may be charged wirelessly or through a micro-USB interface. In some implementations (not shown), the battery 724 may be replaced by another type of power supply (e.g., a capacitor that is charged by a circuit receiving power via an inductive coupling).

FIG. 7B is a block diagram of an example of a system 730 configured for image capture. The system 730 includes an image capture device 740 (e.g., the movable imaging assembly 160 or the movable imaging assembly 162) and a personal computing device 760 that communicate via a communications link 750. The image capture device 740 includes one or more image sensors 742 that are configured to capture images. The image capture device 740 includes a communications interface 748 configured to transfer images via the communication link 750 to the personal computing device 760. The personal computing device 760 includes a processing apparatus 762 that is configured to receive, using the communications interface 766, images from the one or more image sensors 742. The image capture device 740 includes gimbals and motors 744 that are actuators of a mechanical stabilization system configured to control an orientation of the one or more image sensors 742 (e.g., an orientation with respect to a movable platform). The gimbals and motors 744 may be controlled by a controller of the mechanical stabilization system, which may be implemented by the processing apparatus 762 (e.g., as a software module or a specialized hardware module) and provide control signals to the motors 744 via the communication link 750. The processing apparatus 762 may be configured to perform image signal processing (e.g., filtering, tone mapping, stitching, electronic image stabilization, and/or encoding) to generate output images based on image data from the one or more image sensors 742. The image capture device 740 includes one or more motion sensors 746 configured to detect motion of the one or more image sensors 742. The one or more motion sensors 746 may provide feedback signals (e.g., via communication link 750 or internally within the image capture device 740) to the mechanical stabilization system. For example, the system 730 may be used to implement processes described in this disclosure, such as the process 800 of FIG. 8, the process 900 of FIG. 9, and the process 1000 of FIG. 10.

The one or more image sensors 742 are configured to capture images. The one or more image sensors 742 are configured to detect light of a certain spectrum (e.g., the visible spectrum or the infrared spectrum) and convey information constituting an image as electrical signals (e.g., analog or digital signals). For example, the one or more image sensors 742 may include charge-coupled devices (CCD) or active pixel sensors in complementary metal-oxide-semiconductor (CMOS). The one or more image sensors 742 may detect light incident through respective lens (e.g., a rectilinear lens or a fisheye lens). In some implementations, the one or more image sensors 742 include analog-to-digital converters. In some implementations, the one or more image sensors 742 have respective fields of view that overlap.

The processing apparatus 762 may include one or more processors having single or multiple processing cores. The processing apparatus 762 may include memory, such as random access memory device (RAM), flash memory, or any other suitable type of storage device such as a non-transitory computer readable memory. The memory of the processing apparatus 762 may include executable instructions and data that can be accessed by one or more processors of the processing apparatus 762. For example, the processing apparatus 762 may include one or more DRAM modules such as double data rate synchronous dynamic random-access memory (DDR SDRAM). In some implementations, the processing apparatus 762 may include a digital signal processor (DSP). In some implementations, the processing apparatus 762 may include an application specific integrated circuit (ASIC). For example, the processing apparatus 762 may include a custom image signal processor.

The mechanical stabilization system for the one or more image sensors 742 includes the gimbals and motors 744. The gimbals and motors 744 may be parts of a mechanical stabilization system (e.g., the mechanical stabilization system 220). The gimbals and motors 744 may connect the one or more image sensors 742 to a movable platform and control their orientation. The gimbals and motors 744 may span multiple axes (e.g., a 7-axis gimbal set with brushless direct current motors). The mechanical stabilization system may include a controller (e.g., a proportional integral derivative (PID) controller). For example, the controller of the mechanical stabilization system may be implemented by the processing apparatus 762 (e.g., as a software module or a specialized hardware module). For example, the controller of the mechanical stabilization system may be implemented by a specialized hardware module integrated with the image capture device 740.

The one or more motion sensors 746 are configured to detect motion of the one or more image sensors 742. For example, the one or more motion sensors 746 may include parts of an inertial measurement unit (e.g., including gyroscopes, accelerometers, and/or magnetometers) that is mounted in a housing with the one or more image sensors 742. In some implementations, the one or more motion sensors 746 may include parts of an inertial measurement unit that is mounted in a movable platform (e.g., the aerial vehicle 120 or the handheld module 130) of the image capture device 740. In some implementations, the one or more motion sensors 746 include sensors (e.g., magnetic encoders, optical encoders, and/or potentiometers) that detect the state of the gimbals and motors 744 to measure a relative orientation of the image sensor and a movable platform of the image capture device 740. For example, the one or more motion sensors 746 may include encoders configured to detect a position and orientation of the image sensor relative to a movable platform (e.g., the aerial vehicle 120 or the handheld module 130). The processing apparatus 762 may be configured to determine a sequence of orientation estimates based on sensor data from the one or more motion sensors 746. For example, determining the sequence of orientation estimates may include applying quadratic estimation to sensor data from a plurality of the one or more motion sensors 746. In some implementations, the motion sensors 746 include a GPS receiver that generates GPS position data for the image capture device 740.

The communications link 750 may be a wired communications link or a wireless communications link. The communications interface 748 and the communications interface 766 may enable communications over the communications link 750. For example, the communications interface 748 and the communications interface 766 may include a high-definition multimedia interface (HDMI), a universal serial bus (USB) interface, a FireWire interface, a Bluetooth interface, a ZigBee interface, and/or a Wi-Fi interface. For example, the communications interface 748 and the communications interface 766 may be used to transfer image data from the image capture device 740 to the personal computing device 760 for image signal processing (e.g., filtering, tone mapping, stitching, and/or encoding) to generate output images based on image data from the one or more image sensors 742. For example, the communications interface 748 and the communications interface 766 may be used to transfer motion sensor data from the image capture device 740 to the personal computing device 760 for processing in a controller of a mechanical stabilization system. For example, the communications interface 748 and the communications interface 766 may be used to transfer control signals to the image capture device 740 from the personal computing device 760 for controlling the gimbals and motors 744 of a mechanical stabilization system and/or motion of an aerial vehicle of the image capture device 740.

The personal computing device 760 may include a user interface 764. For example, the user interface 764 may include a touchscreen display for presenting images and/or messages to a user and receiving commands from a user. For example, the user interface 764 may include a button or switch enabling a person to manually turn the personal computing device 760 on and off. In some implementations, commands (e.g., start recording video, stop recording video, snap photograph, or select tracking target) received via the user interface 764 may be passed on to the image capture device 740 via the communications link 750.

A user may switch between various usage scenarios of the movable imaging system 100, including the first usage scenario of FIG. 1A and the second usage scenario of FIG. 1B, to tailor their mode of image capture to varying circumstances. For example, a user may implement the process 800 of FIG. 8 using the movable imaging system 100.

Figure 8:
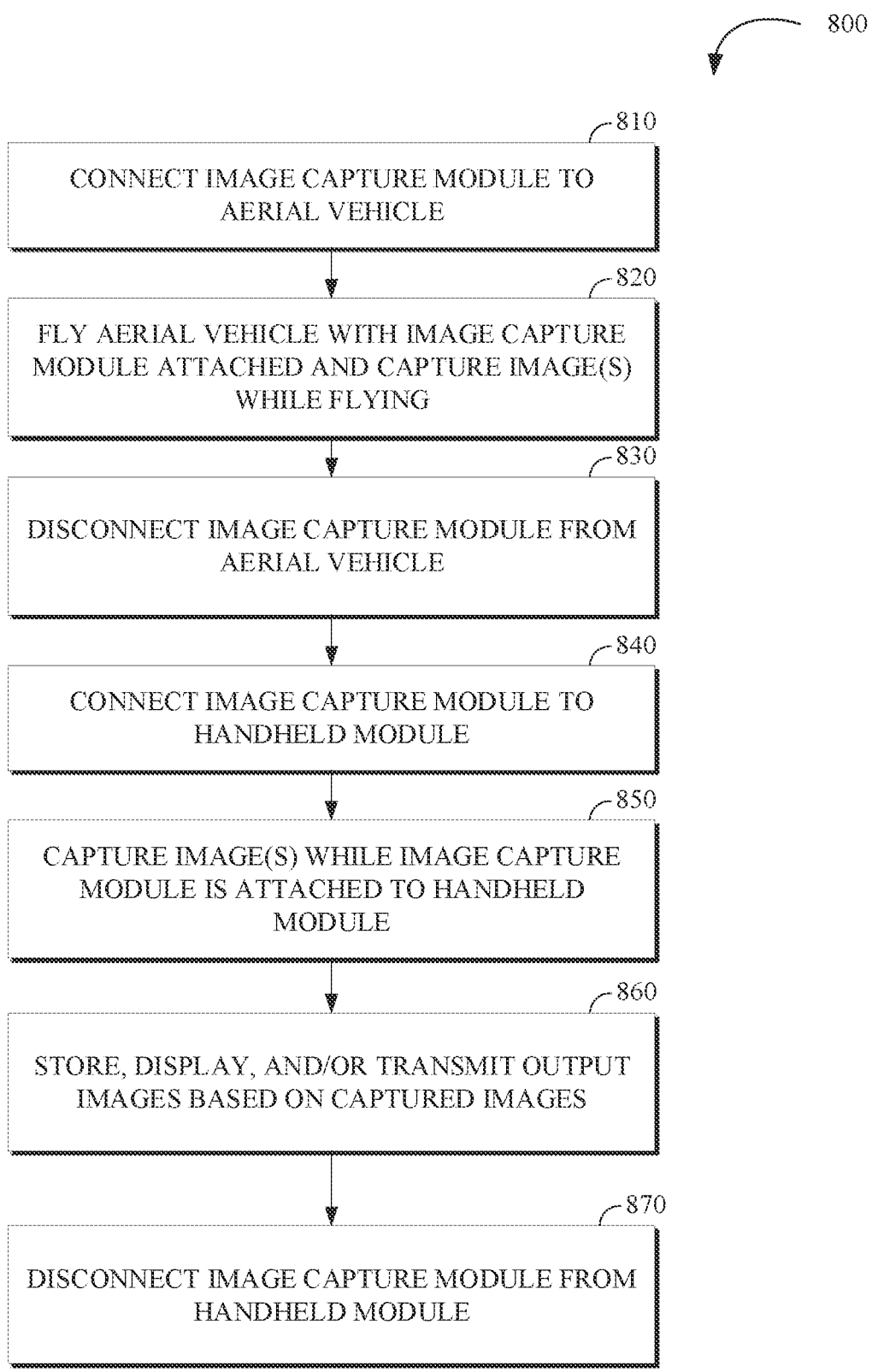
FIG. 8 is a flowchart of an example of a process for utilizing a movable imaging system with modular components in multiple usage scenarios.

FIG. 8 is a flowchart of an example of a process 800 for utilizing a movable imaging system with modular components in multiple usage scenarios. The process 800 includes connecting 810 an image capture module, which includes an image sensor and an integrated mechanical stabilization system, to an aerial vehicle; flying 820 the aerial vehicle with the image capture module attached to the aerial vehicle and capturing a first image with the image sensor while flying; disconnecting 830 the image capture module from the aerial vehicle; connecting 840 the image capture module to a handheld module, which includes a battery; capturing 850 a second image with the image sensor while the image capture module is attached to the handheld module and drawing power from the battery; storing, displaying, or transmitting 860 output images based on the first image and the second image; and disconnecting 870 the image capture module from the handheld module. For example, the process 800 may be implemented using the movable imaging system 100.

The process 800 includes connecting 810 an image capture module (e.g., the image capture module 110), which includes an image sensor and an integrated mechanical stabilization system, to an aerial vehicle (e.g., the aerial vehicle 120). For example, the image capture module may include a connector (e.g., the connector 230) that is keyed to a slot (e.g., the slot 530) of the aerial vehicle. For example, connecting 810 the image capture module to the aerial vehicle may include inserting the connector in the slot. When the connector is inserted into the slot, paired fastening mechanisms (e.g., latches) in the connector and the slot may engage to secure the newly formed connection. For example, spring loaded latches may engage to secure the connection. As part of the connection, mated electronic connectors (e.g., USB Type C connectors) nested in the connector and the slot may engage to form an electronic connection including multiple conductors, which may be used to supply power from the aerial vehicle to the image capture module and to transfer control signals and data (e.g., image data) between the attached image capture module and aerial vehicle. For example, the mechanical stabilization system includes gimbals and motors controlled by proportional integral derivative controllers.

The process 800 includes flying 820 the aerial vehicle (e.g., the aerial vehicle 120) with the image capture module (e.g., the image capture module 110) attached to the aerial vehicle and capturing a first image with the image sensor while flying. For example, flying 820 the aerial vehicle and capturing the first image may include issuing commands (e.g., a take-off command, a "follow-me" command to track subject, a start-capture command, and/or six-degrees of freedom navigation and panning commands) to the aerial vehicle and/or the image capture module via a wireless communications link from a controller module (e.g., the controller module 140), a beacon module (e.g., the beacon module 150), and/or a personal computing device (e.g., a smartphone, a tablet, or a laptop). For example, the aerial vehicle may be instructed to follow a user bearing a beacon module that transmits position data to the aerial vehicle. For example, the process 900 of FIG. 9 may be implemented to control the aerial vehicle and attached image capture module with the controller module and the beacon module to cause it to capture the first image.

The process 800 includes disconnecting 830 the image capture module (e.g., the image capture module 110) from the aerial vehicle (e.g., the aerial vehicle 120). For example, disconnecting 830 the image capture module from the aerial vehicle may include releasing fastening mechanisms of the connector (e.g., the connector 230) and the slot (e.g., the slot 530). For example, latches may be manually released by a user using their fingers on buttons or release levers. In some implementations, two latches must be simultaneously released in order to disconnect 830 the aerial vehicle from the image capture module.

The process 800 includes connecting 840 the image capture module (e.g., the image capture module 110) to a handheld module (e.g., the handheld module 130), which includes a battery and an integrated display. For example, the image capture module may include a connector (e.g., the connector 230) that is keyed to a slot (e.g., the slot 340) of the handheld module. For example, connecting 840 the image capture module to the handheld module may include inserting the connector in the slot. When the connector is inserted into the slot, paired fastening mechanisms (e.g., latches) in the connector and the slot may engage to secure the newly formed connection. For example, spring loaded latches may engage to secure the connection. As part of the connection, mated electronic connectors (e.g., USB Type C connectors) nested in the connector and the slot may engage to form an electronic connection including multiple conductors, which may be used to supply power from the battery to the image capture module and to transfer control signals and data (e.g., image data) between the attached image capture module and handheld module.

The process 800 includes capturing 850 a second image with the image sensor while the image capture module (e.g., the image capture module 110) is attached to the handheld module (e.g., the handheld module 130) and drawing power from the battery. For example, capturing 850 the second image may include issuing commands (e.g., a "follow-me" command to track subject, a "selfie-mode" command, a "HiLight Tag" command, a start-capture command, and/or three-degrees of freedom panning commands) to the handheld module and/or the image capture module via a wireless communications link from a controller module (e.g., the controller module 140), a beacon module (e.g., the beacon module 150), and/or a personal computing device (e.g., a smartphone, a tablet, or a laptop). For example, the handheld module may be instructed to follow a user bearing a beacon module that transmits position data to the handheld module.

The process 800 includes storing, displaying, or transmitting 860 output images based on the first image and the second image. For example, the process 1000 of FIG. 10 may be implemented to transmit and display 860 an output image based on the second image. In some implementations, one of the output image is the first image. In some implementations, one of the output images is the second image. In some implementations, the first image and the second image may by subject to additional image processing (e.g., perceptual tone mapping, lens distortion correction, electronic rolling shutter correction, stitching with parallax correction and blending to combine images from multiple image sensors, and/or output projection) to determine respective output images. For example, the output images may be transmitted 860 to an external device (e.g., a personal computing device) for display or storage. For example, the output images may be stored 860 in memory of a processing apparatus (e.g., the processing apparatus 712 or the processing apparatus 762). For example, the output images may be displayed 860 in the user interface 720 or in the user interface 764. For example, the output images may be transmitted 860 via the communications interface 722.

The process 800 includes disconnecting 870 the image capture module (e.g., the image capture module 110) from the handheld module (e.g., the handheld module 130). For example, disconnecting 870 the image capture module from the handheld module may include releasing fastening mechanisms of the connector (e.g., the connector 230) and the slot (e.g., the slot 340). For example, latches may be manually released by a user using their fingers on buttons or release levers. In some implementations, two latches must be simultaneously released in order to disconnect 830 the handheld module from the image capture module.

Figure 9:
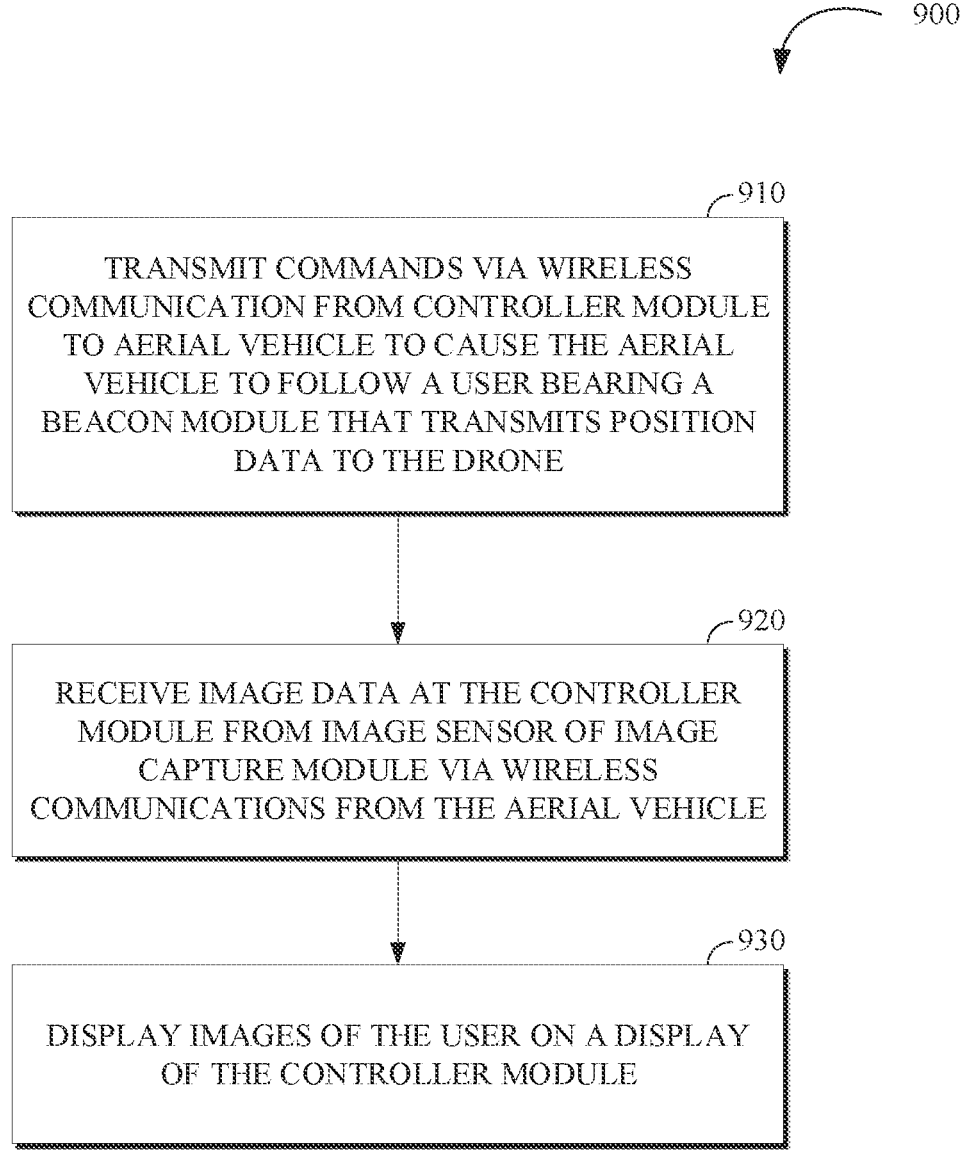
FIG. 9 is a flowchart of an example of a process for controlling a movable imaging assembly for image capture using a controller module and a beacon module.

FIG. 9 is a flowchart of an example of a process 900 for controlling a movable imaging assembly for image capture using a controller module and a beacon module. The process 900 includes transmitting 910 commands via wireless communications from a controller module to the aerial vehicle to cause an aerial vehicle to follow a user bearing a beacon module that transmits position data to the aerial vehicle; receiving 920 image data at the controller module from the image sensor via wireless communications from the aerial vehicle; and displaying 930 images of the user on a display of the controller module. For example, the process 800 may be implemented using the movable imaging system 100.

The process 900 includes transmitting 910 commands via wireless communications from a controller module (e.g., the controller module 140) to an aerial vehicle (e.g., the aerial vehicle 120) to cause the aerial vehicle to follow a user bearing a beacon module (e.g., the beacon module 150) that transmits position data to the aerial vehicle. For example, the beacon module may include a GPS receiver and the position data may include GPS coordinates of the beacon module. In some implementations, beacon module includes an inertial measurement unit (e.g., including accelerometers, gyroscopes, and/or magnetometers) and the position data includes changes in the position and/or orientation of the beacon module that are sensed by the inertial measurement unit. For example, the wireless communications may utilize a wireless interface standard, such as WiFi, Bluetooth (BT), cellular data link, ZigBee, or ANT+.

The process 900 includes receiving 920 image data at the controller module (e.g., the controller module 140) from the image sensor via wireless communications from the aerial vehicle (e.g., the aerial vehicle 120). The process 900 includes displaying 930 images of the user on a display (e.g., the display 610) of the controller module (e.g., the controller module 140).

Figure 10:
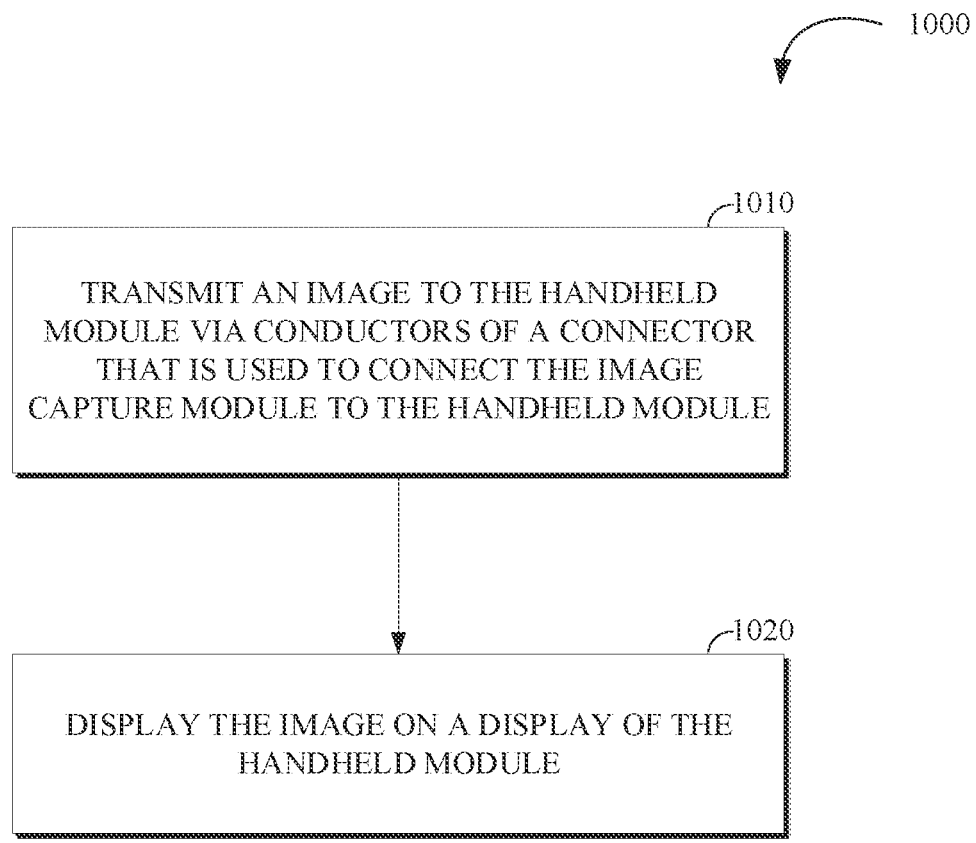
FIG. 10 is a flowchart of an example of a process for displaying images captured with an image capture module on a connected handheld module.

FIG. 10 is a flowchart of an example of a process 1000 for displaying images captured with an image capture module (e.g., the image capture module 110) on a connected handheld module (e.g., the handheld module 130). The process 1000 includes transmitting 1010 an image to the handheld module via conductors of a connector (e.g., the connector 230) that is used to connect the image capture module to a handheld module and displaying 1020 the second image on a display (e.g., the display 310) of the handheld module. For example, the image may be transmitted 1010 via high-speed bulk transfer (e.g., using a USB 2.0 or USB 3.0 signaling) over the conductors. For example, the image may be transmitted 1010 as raw image (e.g., video) data at the captured frame rate using MIPI signaling. In some implementations, the image is transmitted 1010 via multiple pairs of conductors of the connector, which may include a USB Type C connector.

When the movable imaging assembly 162, including the handheld module 130, is mounted to a chest or shoulder, a user may want to rotate the handle clockwise or counter-clockwise for off-center capture during activities such as snowboarding. A floating pivot quick release mount for the handheld module 130 may allow a user to rotate the movable imaging assembly 162 to 180° quickly and easily during use to enable off-center capture. A movable imaging assembly 162 is inserted downward into gap in a soft inner frame of the mount with a cross-section approximately matching a horizontal cross-section of the handheld module 130. Once snug within the inner frame, a cantilevered latch on a hard outer frame is rotated to a closed/locked position. One or more cables are attached to the latch and wrapped around the outer frame and a floating finger mount. By locking the latch closed, the one or more cables are tightened to secure the floating finger mount in place with sufficient force to keep the floating finger mount locked in position during active use. The outer frame and floating finger mount may have a textured, grooved, or angled contact surface to assist with maintaining a fixed position when locked in place.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
    an image capture module comprising:
        a body;
        an image sensor; and
        a mechanical stabilization system comprising a first gimbal, a second gimbal, and a third gimbal connected to the body and configured to control an orientation of the image sensor of the image capture module relative to the body; and
    a handheld module defining a slot that is keyed to the body of the image capture module,
    wherein the image capture module, when located within the handheld module, has a low profile so that the third gimbal is protected from damage by the handheld module.

2. The system of claim 1, wherein the third gimbal is substantially flush with the handheld module when the image capture module is located within the slot.

3. The system of claim 1, wherein the handheld module further comprises:
    a control interface that is configured to control functions of the image capture module.

4. The system of claim 3, wherein the control interface comprises a record button.

5. The system of claim 1, wherein the first gimbal includes a first motor, the second gimbal includes a second motor, and the third gimbal includes a third motor.

6. The system of claim 1, wherein the body of the image capture module is nested inside of the slot of the handheld module.

7. A system comprising:
- an image capture module comprising:
  - a body;
  - a connector located at a bottom of the body;
  - an image sensor; and
  - a mechanical stabilization system comprising a first gimbal, a second gimbal, and a third gimbal connected to the body and configured to control an orientation of the image sensor of the image capture module relative to the body; and
- a handheld module comprising:
  - a slot that receives the connector of the image capture module; and
  - a fastening mechanism that is configured to form a removable locked connection between the image capture module and the handheld module so that when the connector is inserted into the slot, a connection is formed between the image capture module and the handheld module.

8. The system of claim 7, wherein the handheld module further comprises:
- a status indicator light.

9. The system of claim 8, wherein the handheld module further comprises:
- a microphone configured to support capture of stereo sound.

10. The system of claim 9, wherein the handheld module further comprises:
- a wireless communications link configured to transfer data.

11. The system of claim 10, wherein the wireless communications link wirelessly couples the image capture module and the handheld module to one another.

12. The system of claim 11, wherein the wireless communications link is configured to connect the image capture module and the handheld module to a personal computing device.

13. The system of claim 12, wherein the personal computing device is a smartphone.

14. The system of claim 7, wherein the fastening mechanism comprises a slider that is movable to disconnect the handheld module from the image capture module.

15. A system comprising:
- an image capture module comprising:
  - a body;
  - a mated electronic connector located at a base of the body;
  - an image sensor; and
  - a mechanical stabilization system comprising a first gimbal, a second gimbal, and third gimbal connected to the body and configured to move of the image sensor; and
- a handheld module defining a slot that is shaped to match a shape of the body of the image capture module,
- wherein the image capture module, when located within the slot of the handheld module, has a profile so that the third gimbal is protected from damage by the handheld module.

16. The system of claim 15, wherein the third gimbal of the mechanical stabilization system is substantially flush with a surface of the handheld module when the image capture module is located within the slot of the handheld module.

17. The system of claim 15, wherein the handheld module further comprises:
- a control interface that is configured to control functions of the image capture module.

18. The system of claim 17, wherein the control interface comprises a record button.

19. The system of claim 15, wherein the image sensor is configured to detect images while the image capture module is located within the slot of the handheld module.

20. The system of claim 15, wherein the slot has a length that is substantially equal to a length of the body.

* * * * *